US009008092B2

(12) United States Patent
Thubert et al.

(10) Patent No.: US 9,008,092 B2
(45) Date of Patent: Apr. 14, 2015

(54) ROUTE PREFIX AGGREGATION USING REACHABLE AND NON-REACHABLE ADDRESSES IN A COMPUTER NETWORK

(75) Inventors: Pascal Thubert, La Colle sur Loup (FR); Patrick Wetterwald, Mouans Sartoux (FR); Jean-Philippe Vasseur, Saint Martin d'Uriage (FR)

(73) Assignee: Cisco Technology, Inc., San Jose, CA (US)

(*) Notice: Subject to any disclaimer, the term of this patent is extended or adjusted under 35 U.S.C. 154(b) by 359 days.

(21) Appl. No.: 13/269,203

(22) Filed: Oct. 7, 2011

(65) Prior Publication Data
US 2013/0088999 A1    Apr. 11, 2013

(51) Int. Cl.
| | |
|---|---|
| H04L 12/28 | (2006.01) |
| H04L 12/751 | (2013.01) |
| H04L 29/12 | (2006.01) |
| H04L 12/721 | (2013.01) |
| H04W 40/24 | (2009.01) |
| H04L 12/741 | (2013.01) |
| H04W 40/02 | (2009.01) |
| H04L 12/709 | (2013.01) |

(52) U.S. Cl.
CPC ............ *H04L 45/02* (2013.01); *H04L 61/6095* (2013.01); *H04L 45/123* (2013.01); *H04W 40/02* (2013.01); *H04L 45/245* (2013.01); *H04W 40/248* (2013.01); *H04L 45/74* (2013.01)

(58) Field of Classification Search
CPC ......... H04L 45/00; H04L 45/02; H04L 45/74; H04L 45/123; H04L 45/245; H04L 43/0811; H04L 1/1614; H04L 61/6095; H04L 29/1299; H04W 40/02; H04W 40/248

USPC ......... 370/252, 254, 389, 392, 393, 401, 466, 370/255–258, 351; 709/221, 238
See application file for complete search history.

(56) References Cited

U.S. PATENT DOCUMENTS

| | | | |
|---|---|---|---|
| 7,453,883 | B1 | 11/2008 | Lynch et al. |
| 7,684,355 | B2 | 3/2010 | Meier et al. |
| 7,808,927 | B2 | 10/2010 | Retana et al. |
| 7,814,185 | B2* | 10/2010 | Choe .............................. 709/221 |
| 7,852,852 | B2 | 12/2010 | Lynch et al. |
| 7,889,712 | B2 | 2/2011 | Talur et al. |
| 7,933,197 | B2 | 4/2011 | Bryant et al. |
| 7,940,649 | B2 | 5/2011 | Kapoor et al. |
| 7,969,983 | B2 | 6/2011 | Guichard et al. |
| 2001/0040895 | A1* | 11/2001 | Templin ........................ 370/466 |

(Continued)

OTHER PUBLICATIONS

T. Winter, Ed, RPL: IPv6 Routing Protocol for Low power and Lossy Networks, 2010.*

(Continued)

*Primary Examiner* — Kwang B Yao
*Assistant Examiner* — Harun Chowdhury
(74) *Attorney, Agent, or Firm* — Parker Ibrahim & Berg LLC; James M. Behmke; Stephen D. LeBarron

(57) ABSTRACT

In one embodiment, a network device determines a set of routes to one or more reachable addresses and also a set of no-routes to one or more non-reachable addresses in a computer network. The routes and no-routes may then be aggregated into one or more reachable route prefixes with one or more corresponding non-reachable no-route prefix exceptions. As such, the aggregated combination of route prefixes and no-route prefix exceptions may be utilized by the network device.

21 Claims, 21 Drawing Sheets

(56) References Cited

U.S. PATENT DOCUMENTS

| | | | |
|---|---|---|---|
| 2006/0203744 | A1 | 9/2006 | Patel et al. |
| 2009/0003348 | A1* | 1/2009 | Kulkarni et al. ............. 370/392 |
| 2009/0196181 | A1 | 8/2009 | Retana et al. |
| 2009/0323544 | A1* | 12/2009 | Gaddis et al. ................ 370/252 |
| 2012/0093166 | A1* | 4/2012 | Rosenberg et al. .......... 370/401 |

OTHER PUBLICATIONS

Pozzi, et al., "Notification of Transmittal of the International Search Report and the Written Opinion of the International Searching Authority, or the Declaration", Patent Cooperation Treaty, Feb. 5, 2013, 14 pages, PCT/US2012/058942, European Patent Office, Rijswijk, Netherlands.

Thubert, et al., "LLN Routing Fundamentals", ROLL Working Group, Internet-Draft, draft-thubert-roll-fundamentals-00, Mar. 31, 2009, 33 pages, Internet Engineering Task Force Trust.

Winter et al., "RPL: IPv6 Routing Protocol for Low Power and Lossy Networks", ROLL, Internet Draft, draft-ietf-roll-rpl-08, May 28, 2010, 92 pages, Internet Engineering Task Force Trust.

Winter et al., "RPL: IPv6 Routing Protocol for Low Power and Lossy Networks" <draft-ietf-roll-rpl-19> (Mar. 13, 2011 version), pp. 1-85.

Vasseur et al., "Routing Metrics used for Path Calculation in Low Power and Lossy Networks" <draft-ietf-roll-routing-metrics-19> (Mar. 1, 2011 version), pp. 1-30.

Thubert P., "RPL Objective Function 0", <draft-ietf-roll-of0-15> (Jul. 8, 2011 version), pp. 1-13.

Gnawali et al., "The Minimum Rank Objective Function with Hysteresis" <draft-ietf-roll-minrank-hysteresis-of-04> (May 17, 2011 version), pp. 1-10.

Chen et al., "A Framework for Inter-Domain Route Aggregation" Feb. 1999, pp. 1-13, RFC 2519.

Deering et al., "Internet Protocol, Version 6 (IPv6), Specification", Dec. 1998, pp. 1-39, RFC 2460.

Fuller V., "Supernetting: an Address Assignment and Aggregation Strategy", Jun. 1992, pp. 1-20, RFC 1338.

* cited by examiner

PREVIOUS ADVERTISEMENT:

2001:db8:0:0::/64   2001:db8:0:6::/64   2001:db8:0:a::/64
2001:db8:0:2::/64   2001:db8:0:7::/64   2001:db8:0:b::/64
2001:db8:0:3::/64   2001:db8:0:9::/64   2001:db8:0:f::/64

NOW ONLY ADVERTISE:

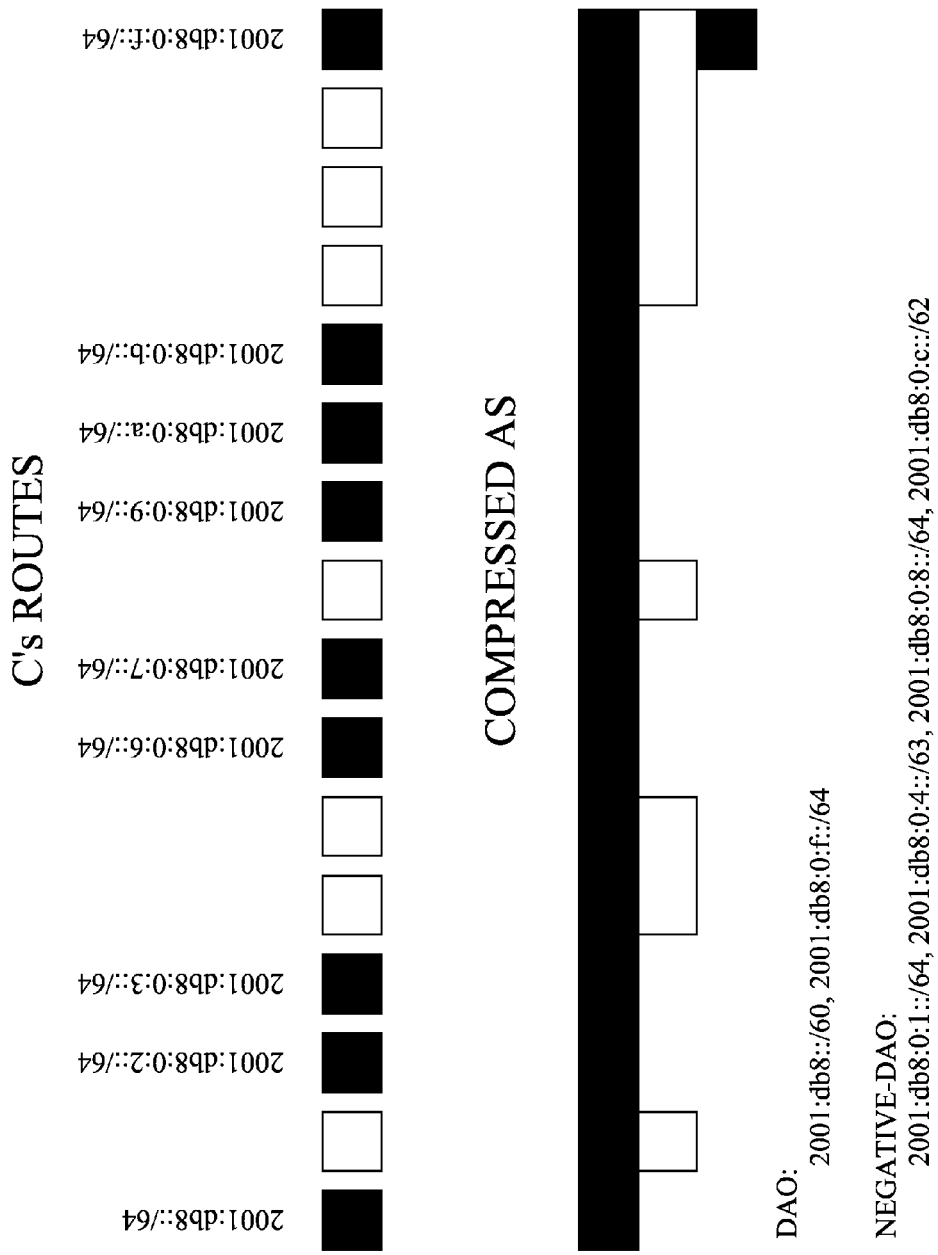

"45," and
ROUTE PREFIX AGGREGATION USING REACHABLE AND NON-REACHABLE ADDRESSES IN A COMPUTER NETWORK

TECHNICAL FIELD

The present disclosure relates generally to computer networks, and, more particularly, to aggregation of routing information in computer networks.

BACKGROUND

Low power and Lossy Networks (LLNs), e.g., sensor networks, have a myriad of applications, such as Smart Grid and Smart Cities. Various challenges are presented with LLNs, such as lossy links, low bandwidth, battery operation, low memory and/or processing capability, etc. One example routing solution to LLN challenges is a protocol called Routing Protocol for LLNs or "RPL," which is a distance vector routing protocol that builds a Destination Oriented Directed Acyclic Graph (DODAG, or simply DAG) in addition to a set of features to bound the control traffic, support local (and slow) repair, etc. The RPL architecture provides a flexible method by which each node performs DODAG discovery, construction, and maintenance.

Notably, the amount of routing information kept in a network, particularly in LLNs, can become significant. In particular, the size of the routing table and/or the size or number of route advertisements becomes a major concern as the network grows larger. These problems, though found in any network, are especially problematic in constrained networks, where bandwidth is limited and most nodes are highly constrained in terms of memory. Accordingly, routing information can directly impact the scalability of many networks.

BRIEF DESCRIPTION OF THE DRAWINGS

The embodiments herein may be better understood by referring to the following description in conjunction with the accompanying drawings in which like reference numerals indicate identically or functionally similar elements, of which:

FIGS. 5A-5C illustrate an example of bitmap generation according to routes and no-routes;
FIGS. 8A-8B illustrate example prefix-based results of the route aggregation in FIGS. 7A-7B;
FIGS. 10A-10C illustrate an example of advertised and stored aggregated routes.

DESCRIPTION OF EXAMPLE EMBODIMENTS

Overview

Figure 1:
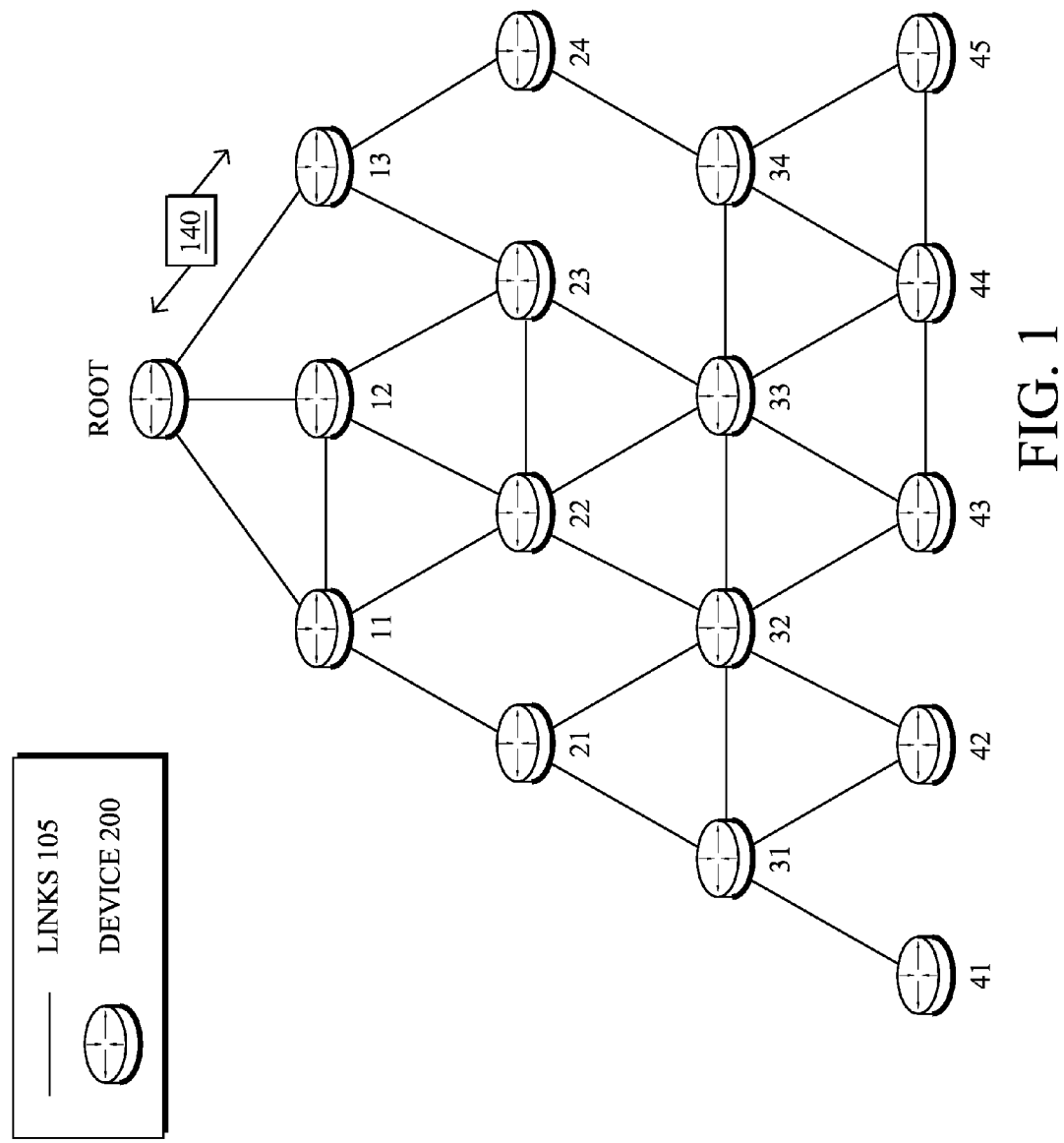
FIG. 1 illustrates an example computer network.

According to one or more embodiments of the disclosure, a network device determines a set of routes to one or more reachable addresses and also a set of no-routes to one or more non-reachable addresses in a computer network. The routes and no-routes may then be aggregated into one or more reachable route prefixes with one or more corresponding non-reachable no-route prefix exceptions (e.g., with reachable route prefix exceptions to the no-route prefix exceptions, etc.). As such, the aggregated combination of route prefixes and no-route prefix exceptions may be utilized by the network device, for example, for reduced-size route advertisements and/or storage.

Description

A computer network is a geographically distributed collection of nodes interconnected by communication links and segments for transporting data between end nodes, such as personal computers and workstations, or other devices, such as sensors, etc. Many types of networks are available, ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, or Powerline Communications (PLC) such as IEEE 61334, IEEE P1901.2, and others. In addition, a Mobile Ad-Hoc Network (MANET) is a kind of wireless ad-hoc network, which is generally considered a self-configuring network of mobile routes (and associated hosts) connected by wireless links, the union of which forms an arbitrary topology.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless or PLC networks. That is, in addition to one or more sensors, each sensor device (node) in a sensor network may generally be equipped with a radio transceiver or other communication port such as PLC, a microcontroller, and an energy source, such as a battery. Often, smart object networks are considered field area networks (FANs), neighborhood area networks (NANs), etc. Generally, size and cost constraints on smart object nodes (e.g., sensors) result in corresponding constraints on resources such as energy, memory, computational speed and bandwidth. Correspondingly, a reactive routing protocol may, though need not, be used in place of a proactive routing protocol for smart object networks.

FIG. 1 is a schematic block diagram of an example computer network 100 illustratively comprising nodes/devices 200 (e.g., labeled as shown, "root," "11," "12," . . . "45," and described in FIG. 2 below) interconnected by various methods of communication. For instance, the links 105 may be wired links or shared media (e.g., wireless links, PLC links, etc.) where certain nodes 200, such as, e.g., routers, sensors, computers, etc., may be in communication with other nodes 200, e.g., based on distance, signal strength, current operational status, location, etc. Those skilled in the art will understand that any number of nodes, devices, links, etc. may be used in the computer network, and that the view shown herein is for simplicity. Also, those skilled in the art will further understand that while the network is shown in a certain orientation, particularly with a "root" node, the network 100 is merely an example illustration that is not meant to limit the disclosure.

Data packets 140 (e.g., traffic and/or messages sent between the devices/nodes) may be exchanged among the nodes/devices of the computer network 100 using predefined network communication protocols such as certain known wired protocols, wireless protocols (e.g., IEEE Std. 802.15.4, WiFi, Bluetooth®, etc.), PLC protocols, or other shared-media protocols where appropriate. In this context, a protocol consists of a set of rules defining how the nodes interact with each other.

Figure 2:
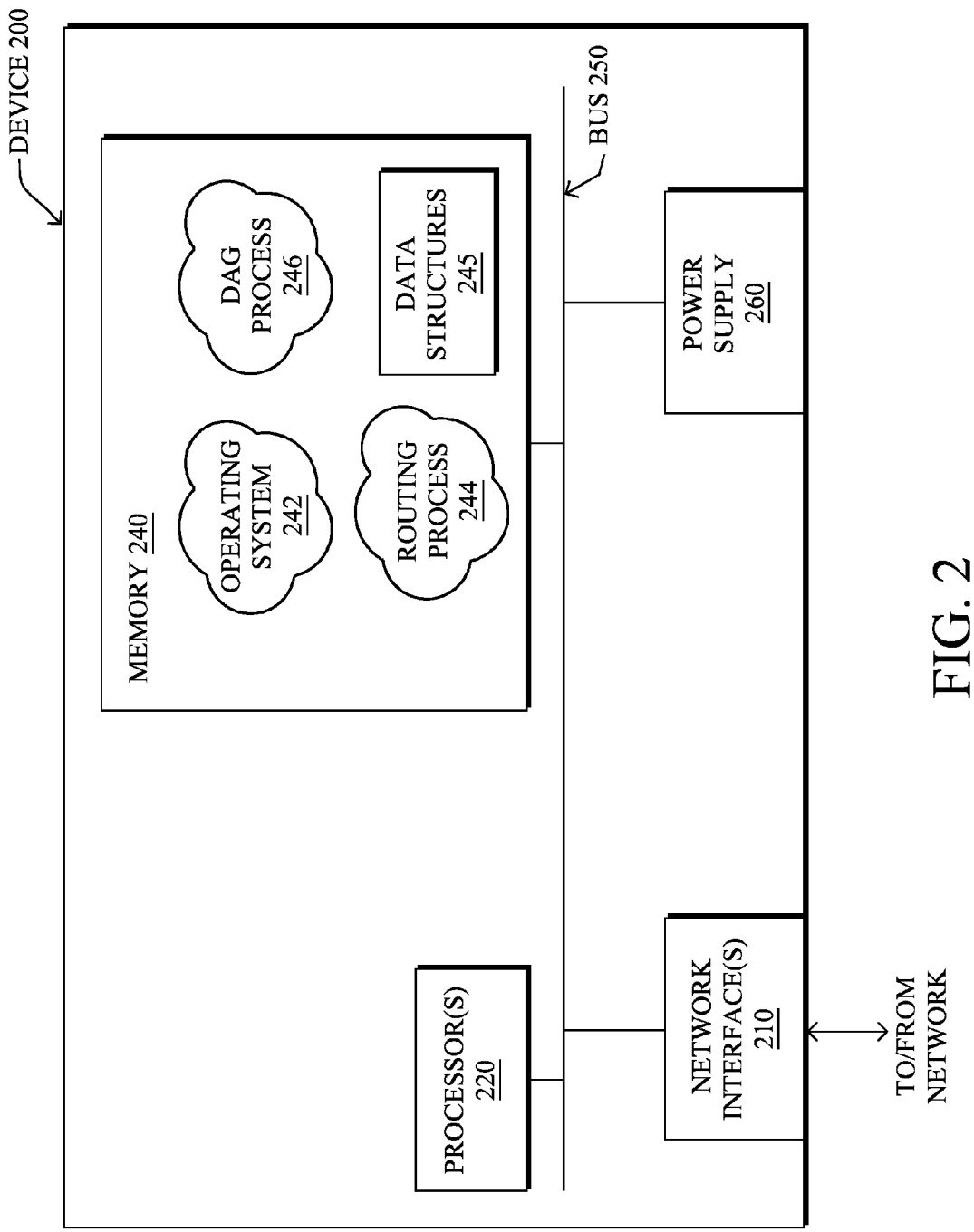
FIG. 2 illustrates an example network device/node.

FIG. 2 is a schematic block diagram of an example node/device 200 that may be used with one or more embodiments described herein, e.g., as any of the nodes shown in FIG. 1 above. The device may comprise one or more network interfaces 210 (e.g., wired, wireless, PLC, etc.), at least one processor 220, and a memory 240 interconnected by a system bus 250, as well as a power supply 260 (e.g., battery, plug-in, etc.).

The network interface(s) 210 contain the mechanical, electrical, and signaling circuitry for communicating data over links 105 coupled to the network 100. The network interfaces may be configured to transmit and/or receive data using a variety of different communication protocols. Note, further, that the nodes may have two different types of network connections 210, e.g., wireless and wired/physical connections, and that the view herein is merely for illustration. Also, while the network interface 210 is shown separately from power supply 260, for PLC the network interface 210 may communicate through the power supply 260, or may be an integral component of the power supply. In some specific configurations the PLC signal may be coupled to the power line feeding into the power supply.

The memory 240 comprises a plurality of storage locations that are addressable by the processor 220 and the network interfaces 210 for storing software programs and data structures associated with the embodiments described herein. Note that certain devices may have limited memory or no memory (e.g., no memory for storage other than for programs/processes operating on the device and associated caches). The processor 220 may comprise necessary elements or logic adapted to execute the software programs and manipulate the data structures 245. An operating system 242, portions of which are typically resident in memory 240 and executed by the processor, functionally organizes the device by, inter alia, invoking operations in support of software processes and/or services executing on the device. These software processes and/or services may comprise routing process/services 244 and a directed acyclic graph (DAG) process 246 in corresponding embodiments. Note that while routing process 244 (and DAG process 246) is shown in centralized memory 240, alternative embodiments provide for the process to be specifically operated within the network interfaces 210.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes.

Routing process (services) 244 contains computer executable instructions executed by the processor 220 to perform functions provided by one or more routing protocols, such as proactive or reactive routing protocols as will be understood by those skilled in the art. These functions may, on capable devices, be configured to manage a routing/forwarding table (a data structure 245) containing, e.g., data used to make routing/forwarding decisions. In particular, in proactive routing, connectivity is discovered and known prior to computing routes to any destination in the network, e.g., link state routing such as Open Shortest Path First (OSPF), or Intermediate-System-to-Intermediate-System (ISIS), or Optimized Link State Routing (OLSR). Reactive routing, on the other hand, discovers neighbors (i.e., does not have an a priori knowledge of network topology), and in response to a needed route to a destination, sends a route request into the network to determine which neighboring node may be used to reach the desired destination. Example reactive routing protocols may comprise Ad-hoc On-demand Distance Vector (AODV), Dynamic Source Routing (DSR), DYnamic MANET On-demand Routing (DYMO), etc. Notably, on devices not capable or configured to store routing entries, routing process 244 may consist solely of providing mechanisms necessary for source routing techniques. That is, for source routing, other devices in the network can tell the less capable devices exactly where to send the packets, and the less capable devices simply forward the packets as directed.

Low power and Lossy Networks (LLNs), e.g., certain sensor networks, may be used in a myriad of applications such as for "Smart Grid" and "Smart Cities." A number of challenges in LLNs have been presented, such as:

1) Links are generally lossy, such that a Packet Delivery Rate/Ratio (PDR) can dramatically vary due to various sources of interferences, e.g., considerably affecting the bit error rate (BER);

2) Links are generally low bandwidth, such that control plane traffic must generally be bounded and negligible compared to the low rate data traffic;

3) There are a number of use cases that require specifying a set of link and node metrics, some of them being dynamic, thus requiring specific smoothing functions to avoid routing instability, considerably draining bandwidth and energy;

4) Constraint-routing may be required by some applications, e.g., to establish routing paths that will avoid non-encrypted links, nodes running low on energy, etc.;

5) Scale of the networks may become very large, e.g., on the order of several thousands to millions of nodes; and 6) Nodes may be constrained with a low memory, a reduced processing capability, a low power supply (e.g., battery).

In other words, LLNs are a class of network in which both the routers and their interconnect are constrained: LLN routers typically operate with constraints, e.g., processing power, memory, and/or energy (battery), and their interconnects are characterized by, illustratively, high loss rates, low data rates, and/or instability. LLNs are comprised of anything from a few dozen and up to thousands or even millions of LLN routers, and support point-to-point traffic (between devices inside the LLN), point-to-multipoint traffic (from a central control point to a subset of devices inside the LLN) and multipoint-to-point traffic (from devices inside the LLN towards a central control point).

An example protocol specified in an Internet Engineering Task Force (IETF) Internet Draft, entitled "RPL: IPv6 Routing Protocol for Low Power and Lossy Networks" <draft-ietf-roll-rpl-19> by Winter, at al. (Mar. 13, 2011 version), provides a mechanism that supports multipoint-to-point (MP2P) traffic from devices inside the LLN towards a central control point (e.g., LLN Border Routers (LBRs) or "root nodes/devices" generally), as well as point-to-multipoint (P2MP) traffic from the central control point to the devices inside the LLN (and also point-to-point, or "P2P" traffic). RPL (pronounced "ripple") may generally be described as a distance vector routing protocol that builds a Directed Acyclic Graph (DAG) for use in routing traffic/packets 140, in addition to defining a set of features to bound the control traffic, support repair, etc. Notably, as may be appreciated by those skilled in the art, RPL also supports the concept of Multi-Topology-Routing (MTR), whereby multiple DAGs can be built to carry traffic according to individual requirements.

A DAG is a directed graph having the property that all edges (and/or vertices) are oriented in such a way that no cycles (loops) are supposed to exist. All edges are contained in paths oriented toward and terminating at one or more root nodes (e.g., "clusterheads or "sinks"), often to interconnect the devices of the DAG with a larger infrastructure, such as the Internet, a wide area network, or other domain. In addition, a Destination Oriented DAG (DODAG) is a DAG rooted at a single destination, i.e., at a single DAG root with no outgoing edges. A "parent" of a particular node within a DAG is an immediate successor of the particular node on a path towards the DAG root, such that the parent has a lower "rank" than the particular node itself, where the rank of a node identifies the node's position with respect to a DAG root (e.g., the farther away a node is from a root, the higher is the rank of that node). Further, in certain embodiments, a sibling of a node within a DAG may be defined as any neighboring node which is located at the same rank within a DAG. Note that siblings do not necessarily share a common parent, and routes between siblings are generally not part of a DAG since there is no forward progress (their rank is the same). Note also that a tree is a kind of DAG, where each device/node in the DAG generally has one parent or one preferred parent.

DAGs may generally be built (e.g., by DAG process 246) based on an Objective Function (OF). The role of the Objective Function is generally to specify rules on how to build the DAG (e.g. number of parents, backup parents, etc.).

In addition, one or more metrics/constraints may be advertised by the routing protocol to optimize the DAG against. Also, the routing protocol allows for including an optional set of constraints to compute a constrained path, such as if a link or a node does not satisfy a required constraint, it is "pruned" from the candidate list when computing the best path. (Alternatively, the constraints and metrics may be separated from the OF.) Additionally, the routing protocol may include a "goal" that defines a host or set of hosts, such as a host serving as a data collection point, or a gateway providing connectivity to an external infrastructure, where a DAG's primary objective is to have the devices within the DAG be able to reach the goal. In the case where a node is unable to comply with an objective function or does not understand or support the advertised metric, it may be configured to join a DAG as a leaf node. As used herein, the various metrics, constraints, policies, etc., are considered "DAG parameters."

Illustratively, example metrics used to select paths (e.g., preferred parents) may comprise cost, delay, latency, bandwidth, expected transmission count (ETX), etc., while example constraints that may be placed on the route selection may comprise various reliability thresholds, restrictions on battery operation, multipath diversity, bandwidth requirements, transmission types (e.g., wired, wireless, etc.). The OF may provide rules defining the load balancing requirements, such as a number of selected parents (e.g., single parent trees or multi-parent DAGs). Notably, an example for how routing metrics and constraints may be obtained may be found in an IETF Internet Draft, entitled "Routing Metrics used for Path Calculation in Low Power and Lossy Networks" <draft-ietf-roll-routing-metrics-19> by Vasseur, et al. (Mar. 1, 2011 version). Further, an example OF (e.g., a default OF) may be found in an IETF Internet Draft, entitled "RPL Objective Function 0" <draft-ietf-roll-of0-15> by Thubert (Jul. 8, 2011 version) and "The Minimum Rank Objective Function with Hysteresis" <draft-ietf-roll-minrank-hysteresis-of-04> by O. Gnawali et al. (May 17, 2011 version).

Building a DAG may utilize a discovery mechanism to build a logical representation of the network, and route dissemination to establish state within the network so that routers know how to forward packets toward their ultimate destination. Note that a "router" refers to a device that can forward as well as generate traffic, while a "host" refers to a device that can generate but does not forward traffic. Also, a "leaf" may be used to generally describe a non-router that is connected to a DAG by one or more routers, but cannot itself forward traffic received on the DAG to another router on the DAG. Control messages may be transmitted among the devices within the network for discovery and route dissemination when building a DAG.

According to the illustrative RPL protocol, a DODAG Information Object (DIO) is a type of DAG discovery message that carries information that allows a node to discover a RPL Instance, learn its configuration parameters, select a DODAG parent set, and maintain the upward routing topology. In addition, a Destination Advertisement Object (DAO) is a type of DAG discovery reply message that conveys destination information upwards along the DODAG so that a DODAG root (and other intermediate nodes) can provision downward routes. A DAO message includes prefix information to identify destinations, a capability to record routes in support of source routing, and information to determine the freshness of a particular advertisement. Notably, "upward" or "up" paths are routes that lead in the direction from leaf nodes towards DAG roots, e.g., following the orientation of the edges within the DAG. Conversely, "downward" or "down" paths are routes that lead in the direction from DAG roots towards leaf nodes, e.g., generally going in the opposite direction to the upward messages within the DAG.

Generally, a DAG discovery request (e.g., DIO) message is transmitted from the root device(s) of the DAG downward toward the leaves, informing each successive receiving device how to reach the root device (that is, from where the request is received is generally the direction of the root). Accordingly, a DAG is created in the upward direction toward the root device. The DAG discovery reply (e.g., DAO) may then be returned from the leaves to the root device(s) (unless unnecessary, such as for UP flows only), informing each successive receiving device in the other direction how to reach the leaves for downward routes. Nodes that are capable of maintaining routing state may aggregate routes from DAO messages that they receive before transmitting a DAO message. Nodes that are not capable of maintaining routing state, however, may attach a next-hop parent address. The DAO message is then sent directly to the DODAG root that can in turn build the topology and locally compute downward routes to all nodes in the DODAG. Such nodes are then reachable using source routing techniques over regions of the DAG that are incapable of storing downward routing state. In addition, RPL also specifies a message called the DIS (DODAG Information Solicitation) message that is sent under specific circumstances so as to discover DAG neighbors and join a DAG or restore connectivity.

Figure 3:
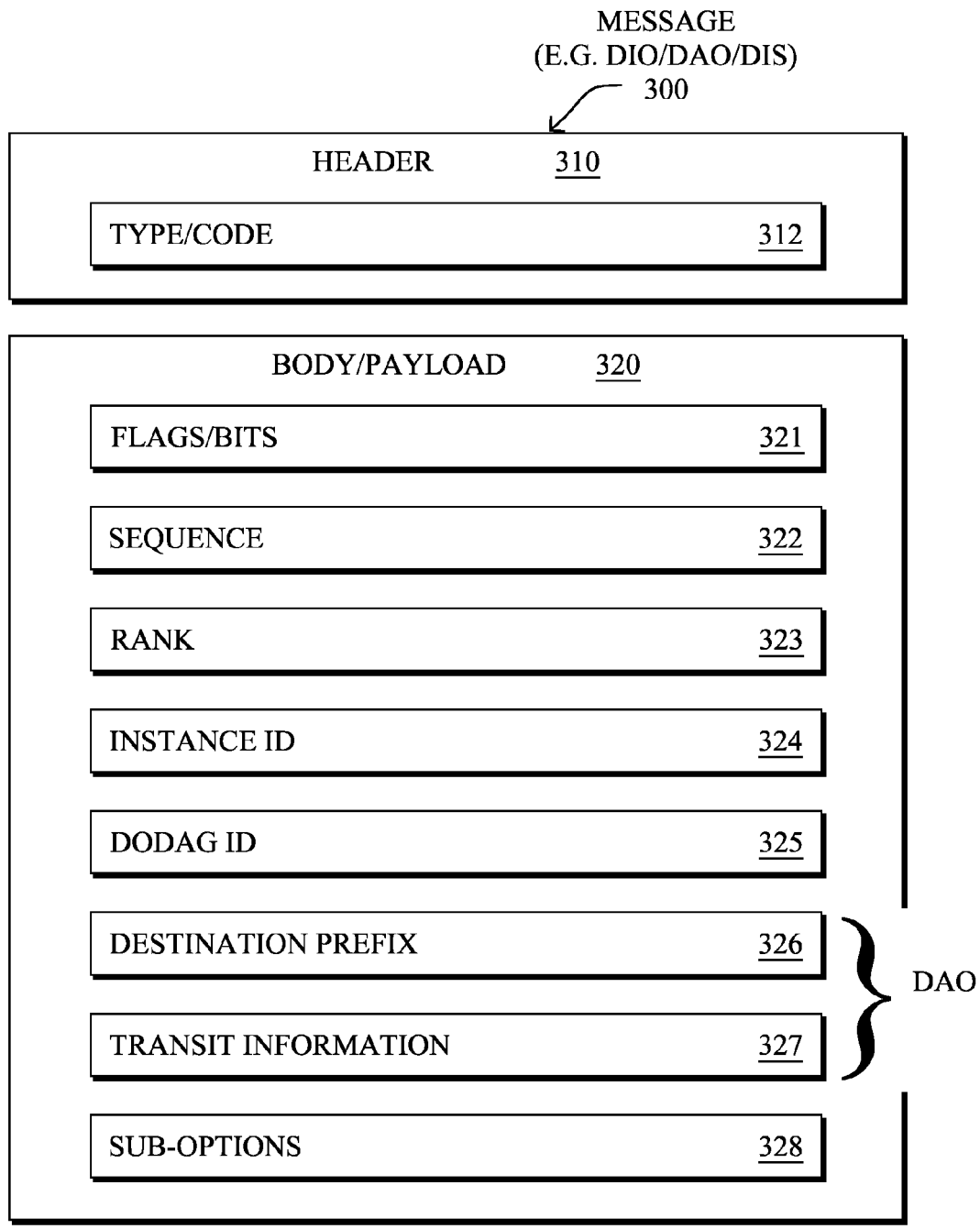
FIG. 3 illustrates an example message format.

FIG. 3 illustrates an example simplified control message format 300 that may be used for discovery and route dissemination when building a DAG, e.g., as a DIO, DAO, or DIS message. Message 300 illustratively comprises a header 310 with one or more fields 312 that identify the type of message (e.g., a RPL control message), and a specific code indicating the specific type of message, e.g., a DIO, DAO, or DIS. Within the body/payload 320 of the message may be a plurality of fields used to relay the pertinent information. In particular, the fields may comprise various flags/bits 321, a sequence number 322, a rank value 323, an instance ID 324, a DODAG ID 325, and other fields, each as may be appreciated in more detail by those skilled in the art. Further, for DAO messages, additional fields for destination prefixes 326 and a transit information field 327 may also be included, among others (e.g., DAO_Sequence used for ACKs, etc.). For any type of message 300, one or more additional sub-option fields 328 may be used to supply additional or custom information within the message 300. For instance, an objective code point (OCP) sub-option field may be used within a DIO to carry codes specifying a particular objective function (OF) to be used for building the associated DAG. Alternatively, sub-option fields 328 may be used to carry other certain information within a message 300, such as indications, requests, capabilities, lists, notifications, etc., as may be described herein, e.g., in one or more type-length-value (TLV) fields.

Figure 4:
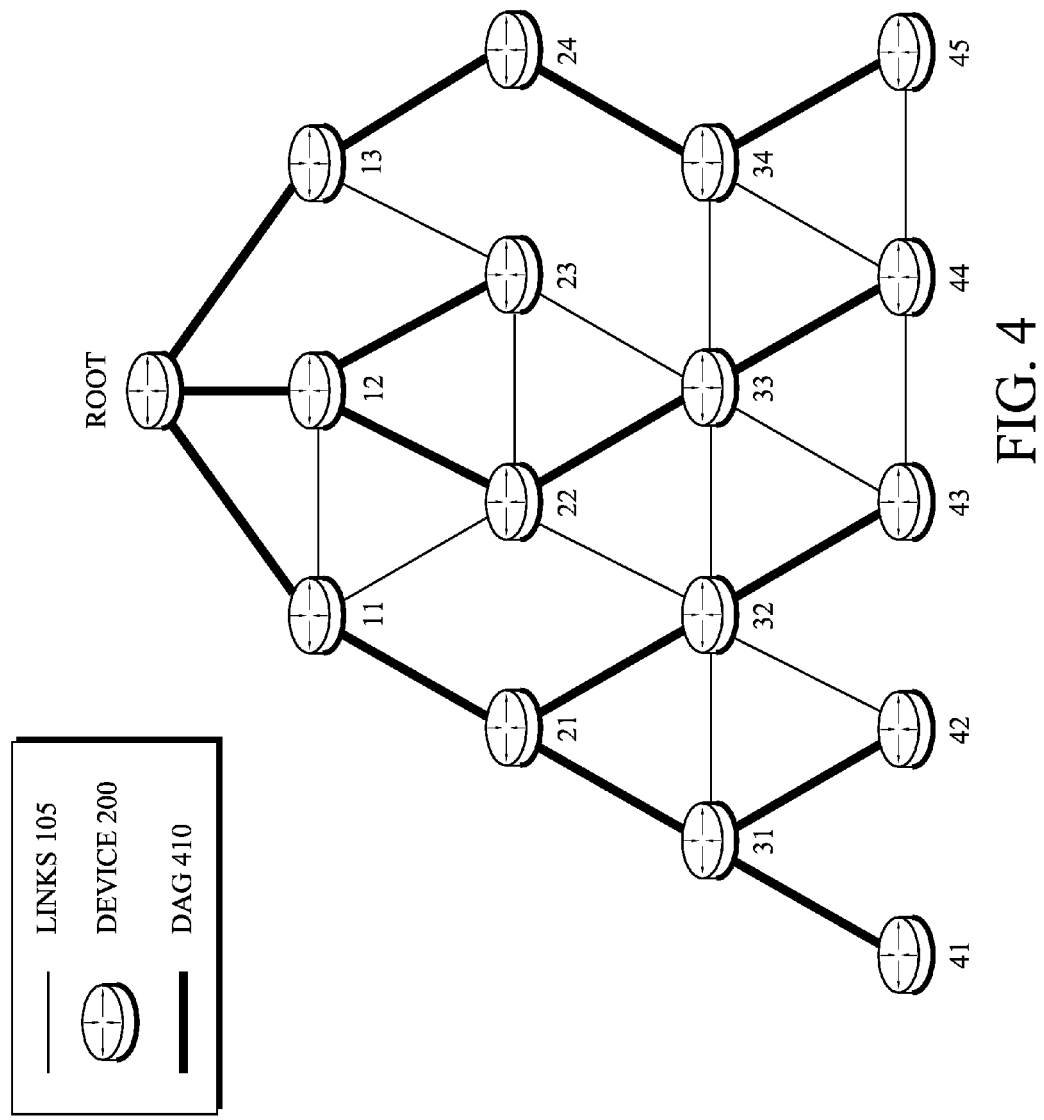
FIG. 4 illustrates an example directed acyclic graph (DAG) in the computer network in FIG. 1.

FIG. 4 illustrates an example simplified DAG that may be created, e.g., through the techniques described above, within network 100 of FIG. 1. For instance, certain links 105 may be selected for each node to communicate with a particular parent (and thus, in the reverse, to communicate with a child, if one exists). These selected links form the DAG 410 (shown as bolded lines), which extends from the root node toward one or more leaf nodes (nodes without children). Traffic/packets 140 (shown in FIG. 1) may then traverse the DAG 410 in either the upward direction toward the root or downward toward the leaf nodes, particularly as described herein.

Route Aggregation with Exception Handling

As noted above, the amount of routing information kept in a network, particularly in LLNs, can become significant. In particular, the size of the routing table and/or the size or number of route advertisements becomes a major concern as the network grows larger. These problems, though found in any network, are especially problematic in constrained networks, where bandwidth is limited and most nodes are highly constrained in terms of memory. Accordingly, routing information can directly impact the scalability of many networks.

For example, according to the illustrative (though not limiting) example RPL protocol in "storing mode," a message from a node "A" to a node "B" may travel up the DAG until it reaches a common ancestor of A and B, where a routing table has been populated thanks to DAO messages, at which point the packet is routed in the down direction until it reaches the destination B. In this manner, RPL defines a hierarchical routing infrastructure with one (or multiple) roots that have the full knowledge of the routes to destinations within the network. Without aggregation, the closer nodes are to the root(s), the larger are the routing tables and route advertisements.

The techniques herein, therefore, provide for routing table and route advertisement compression by aggregating prefixes into ranges of reachable addresses that include non-reachable addresses, and by specifically indicating the non-reachable exceptions (e.g., and reachable exceptions to those exceptions, and so on). Specifically, according to one or more embodiments of the disclosure as described in detail below, a network device determines a set of routes to one or more reachable addresses (e.g., an individual /64 IPv6 routing prefix or /32 IPv4 address, etc.) and also a set of no-routes to one or more non-reachable addresses in a computer network. The routes and no-routes may then be aggregated into one or more reachable route prefixes with one or more corresponding non-reachable no-route prefix exceptions (e.g., with reachable route prefix exceptions to the no-route prefix exceptions, etc.). As such, the aggregated combination of route prefixes and no-route prefix exceptions may be utilized by the network device, for example, for reduced-size route advertisements and/or storage.

Illustratively, the techniques described herein may be performed by hardware, software, and/or firmware, such as in accordance with the routing process 244, which may contain computer executable instructions executed by the processor 220 (or independent processor of interfaces 210) to perform functions relating to the novel techniques described herein, e.g., in conjunction with DAG process 246 where appropriate. For example, the techniques herein may be treated as extensions to conventional protocols, such as the illustrative RPL protocol or other known routing protocols (for constrained networks or unconstrained networks), and as such, may be processed by similar components understood in the art that execute those protocols, accordingly.

Operationally, the techniques herein allow a network device (e.g., router) to aggregate prefix routes even if there are gaps in the bitwise range, and advertise that aggregation to its neighbors (e.g., as a child node to its parent(s)), by expressing gaps as sub-ranges of no-routes. First, a network device 200 determines a set of routes to one or more reachable addresses in a computer network, such as from advertisements or local configuration (e.g., local addresses and/or locally attached/allocated addresses). In addition, the network device also determines a set of no-routes to one or more non-reachable addresses in the computer network. (Note that while the techniques generally describe "non-reachable" no-routes, those skilled in the art will appreciate that "non-reachable" no-routes may indeed imply an inability to route traffic to a particular address, while an alternative interpretation may simply provide for "unused" no-routes, i.e., not necessarily "non-reachable" in the literal sense.) In one embodiment, determining no-routes comprises identifying addresses within a given address range that are not the reachable addresses. Alternatively (or in addition), determining routes and no-routes may be based on receiving an advertisement from one or more neighbors (e.g., children) with associated aggregated route prefixes and no-route prefix exceptions (or "negative routes") as described herein.

From the list of reachable and non-reachable (non-usable) addresses, the network device may then proceed to build its own routing table(s) and/or route advertisements by aggregating the routes and no-routes into one or more reachable route prefixes within which there exist one or more corresponding non-reachable no-route prefix exceptions. Said differently, a range of route prefixes can be recursively established that have exceptions that are no-routes, and within those there can be exceptions that are normal routes, etc. (i.e., recursively aggregating the routes and no-routes with opposing exceptions to exceptions). For instance, a non-reachable no-route prefix exception may have within it one or more reachable route prefix exceptions, those reachable route prefix exceptions may have further no-route prefix exceptions, and so on.

FIGS. 5A-10C below demonstrate greater details of example embodiments of the techniques herein, however as a brief introduction, an illustrative aggregation technique is now described. Note that the aggregation may be performed on a per-child (per-neighbor) routing table, or else may be performed on a general routing table, e.g., used for advertising. Specifically, to build its own aggregation, the network device looks up its routing table (e.g., per-child table) for each individual prefix (e.g., each /64 in a /48 RPL network), and creates a bitmap of the prefixes that are actually available (reachable). A bit is set (e.g., to "1") if there is a route to the prefix, and left as unset (e.g., "0") if there is no route. In other words, according to the illustrative technique, the address prefixes are set up in the bitmap as /64 units (for IPv6 addresses, i.e., individual routing prefixes). Note that if the prefixes were aggregated previously, the bitmap may still be populated with the individual bit values corresponding to the ranges of addresses contained within the prefixes (i.e., uncompressing the prefixes to individual addresses, prior to compressing into aggregated prefixes according to the techniques herein).

Once the routing table is uncompressed as a flat table of /64 units, then for each prefix length (from /63 to /48 in the example), the network device goes through the addresses/prefixes and attempts to merge an even prefix with the next (odd) prefix according to the following illustrative rules detailed in the Figures described below, where "prefix bit value" and "next prefix bit value"→"bit value result at higher aggregation level":

"0" and "0"→"0";
"1" and "1"→"1";
"1" and "0"→"?";
"?" and "0"→"0" bits that are set become route prefixes;
"?" and "1"→"1" bits that are reset become no-route prefixes; and
at the end of the recursion, if the result has "?" blocks then the "1" sub-blocks become route prefixes. In other words, if a final recursion (minimum prefix length) is reached and there is a perfect match resulting in a "?", then the "1" sub-block prefixes still present are extracted without compression, as there is no benefit in this rare occurrence.

For instance, assume that a portion of the bitmap contains the following /64 values: [1 1 0 1]/64. In a first round (building /63 aggregations), the first two consecutive /64 routes become one /63 route following the rule 1 and 1→1, and the next even/odd pair cannot be resolved and so become "?," i.e., [1 ?]/63. At the next level building /62 aggregations, the "1" and "?" will become a "1," and the "0" at the previous level (/64) is stored as a no-route. That is, at this point there is a reachable route to 0/62, and a no-route to the exception 2/64. In this manner, the techniques herein reduce the three original routes (the "1" values in the /64 bitmap) to two routes, one a reachable route, "0/62," and one a non-reachable no-route (negative route), "2/64."

Figure 5A:
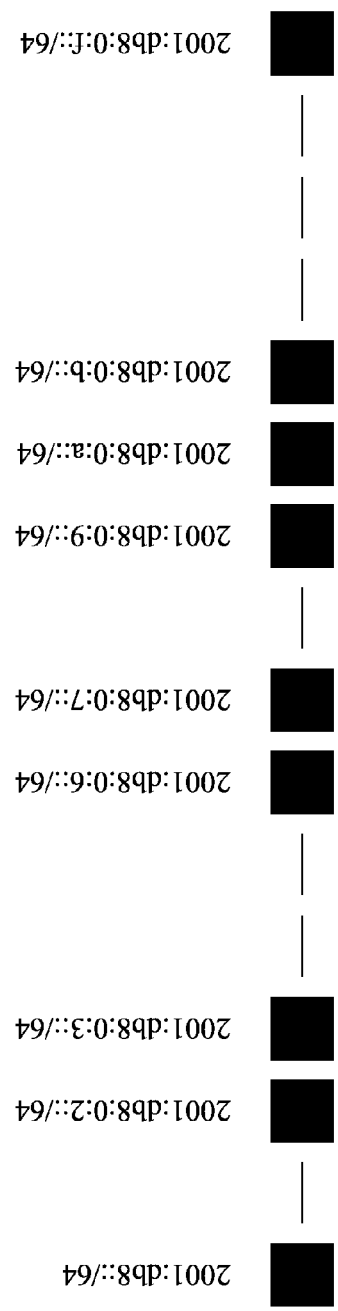

As a more detailed illustration, assume the example shown in FIG. 5A, where the following IPv6 routing prefixes are reachable to a particular network device:
2001:db8::/64;
2001:db8:0:2::/64;
2001:db8:0:3::/64;
2001:db8:0:6::/64;
2001:db8:0:7::/64;
2001:db8:0:9::/64;
2001:db8:0:a::/64;
2001:db8:0:b::/64; and
2001:db8:0:f::/64.

As shown in FIG. 5A, the reachable addresses (routing prefixes) may be represented as part of a bitmap 500, illustratively as solid black blocks representing "1" bit values. Accordingly, it can be determined that the following addresses are unreachable (within this limited address range):
2001:db8:0:1::/64;
2001:db8:0:4::/64;
2001:db8:0:5::/64;
2001:db8:0:8::/64;
2001:db8:0:c::/64;
2001:db8:0:d::/64; and
2001:db8:0:e::/64.

Figure 5B:
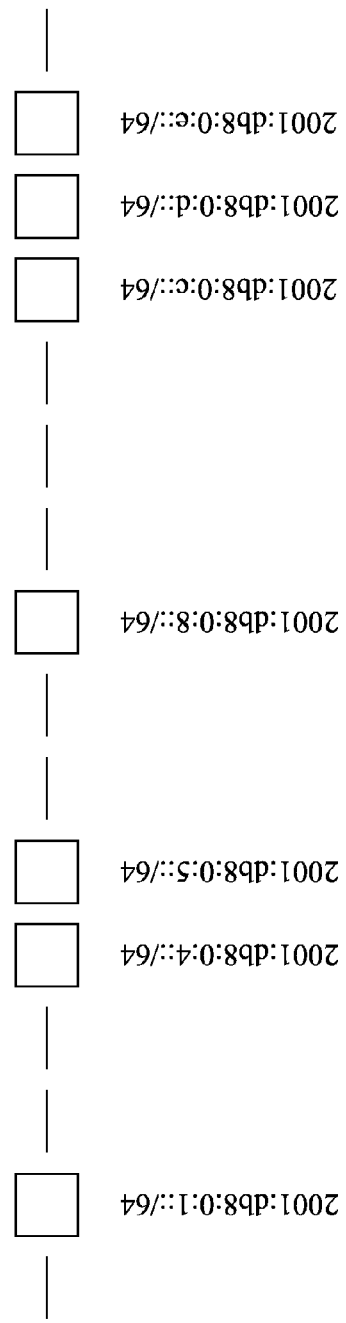

These no-routes to non-reachable addresses are illustrated in FIG. 5B with reference to the bitmap 500 as solid white (empty) blocks representing "0" bit values. By combining FIGS. 5A and 5B, the resultant bitmap 500 of FIG. 5C illustrates both the reachable routes and non-reachable no-routes based on the above-mentioned addresses.

Figure 6A:
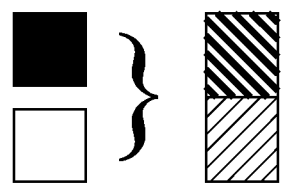
FIGS. 6A-6B illustrate examples of merging bits of the bitmap according to an illustrative algorithm.
Figure 6A:
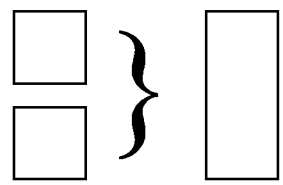
Figure 6A:
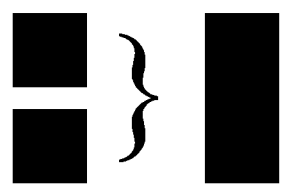
Figure 6A:
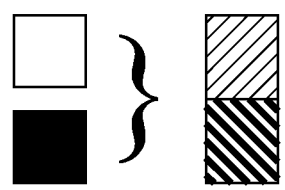

As shown in FIG. 6A, four merge possibilities noted above are shown for various combinations of "1" and "0" bit values between adjacent even/odd prefix pairs. In particular, as described above, aggregating two resolved prefixes (same values) results in the same value (black sub-blocks result in a black aggregated block and while sub-blocks result in a white aggregated block). In addition, either combination of differing values (black/white or white/black) results in an unresolved block value, shown as striped blocks (representing a third unresolved "?" bit value).

Figure 6B:
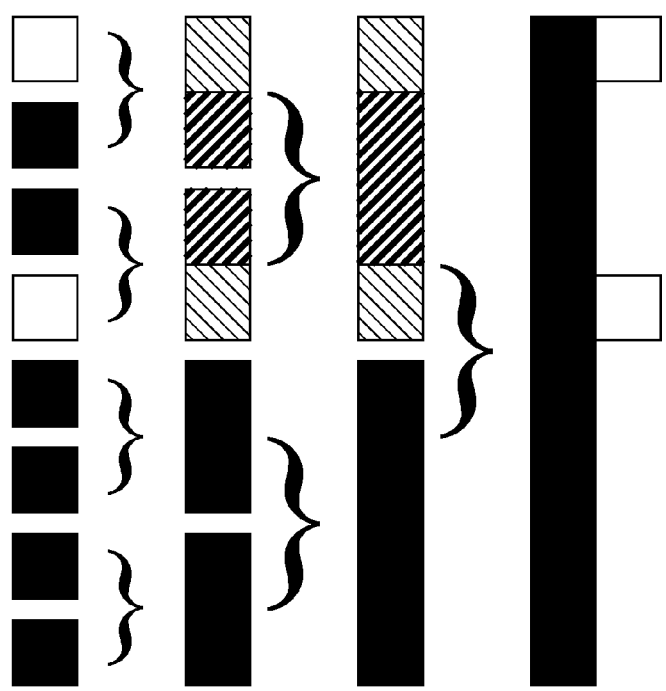

FIG. 6B illustrates the rules to merge unresolved blocks. Specifically, when merging a resolved block with an unresolved block, the merged block assumes the resolved value (e.g., black as shown), and the different valued sub-blocks of the unresolved block (e.g., the white sub-blocks) are added as corresponding prefixes (e.g., no-route prefixes in the shown example). FIG. 6B also illustrates that merging two unresolved blocks results in another unresolved block.

Figure 5C:
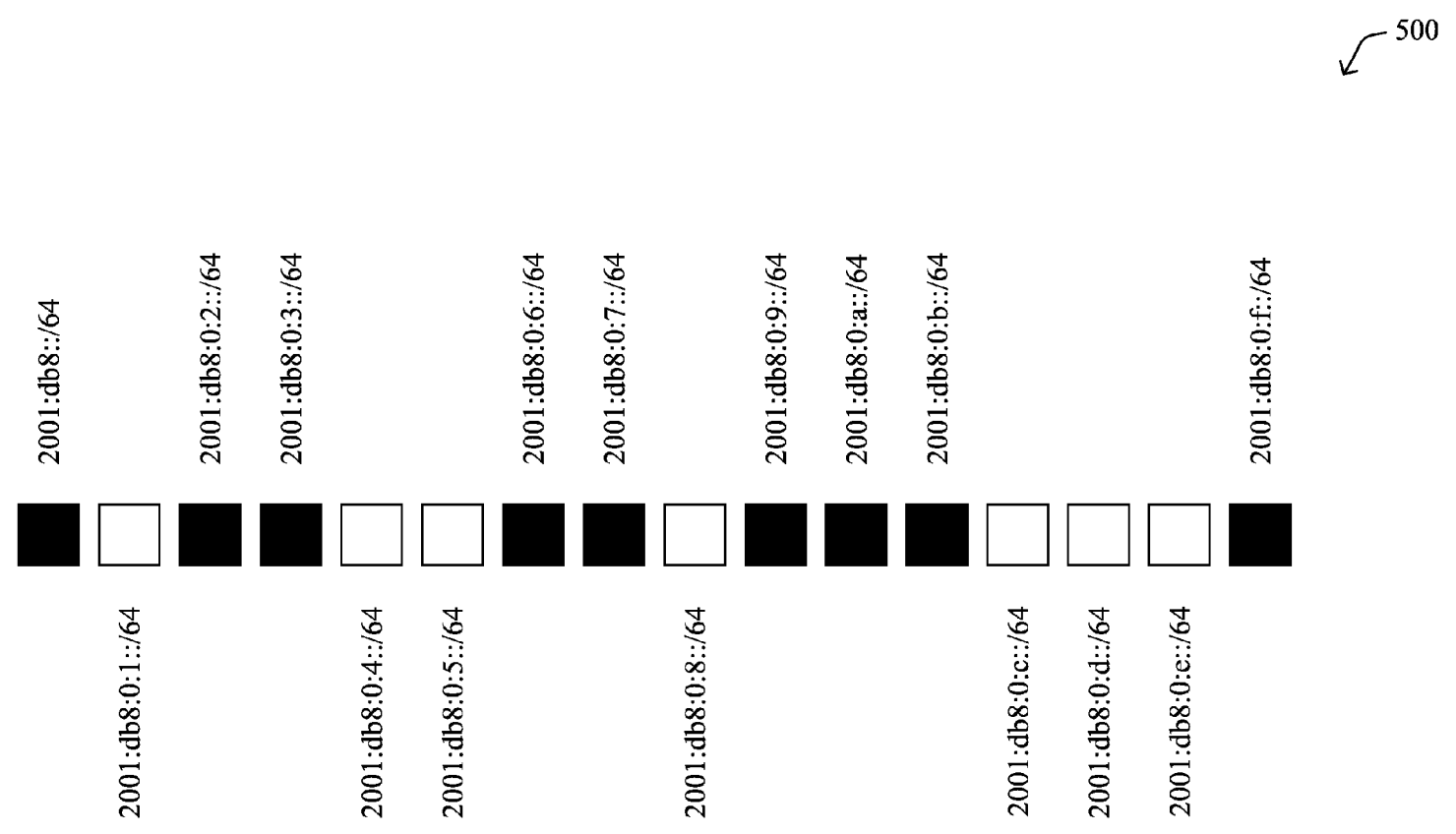
Figure 7A:
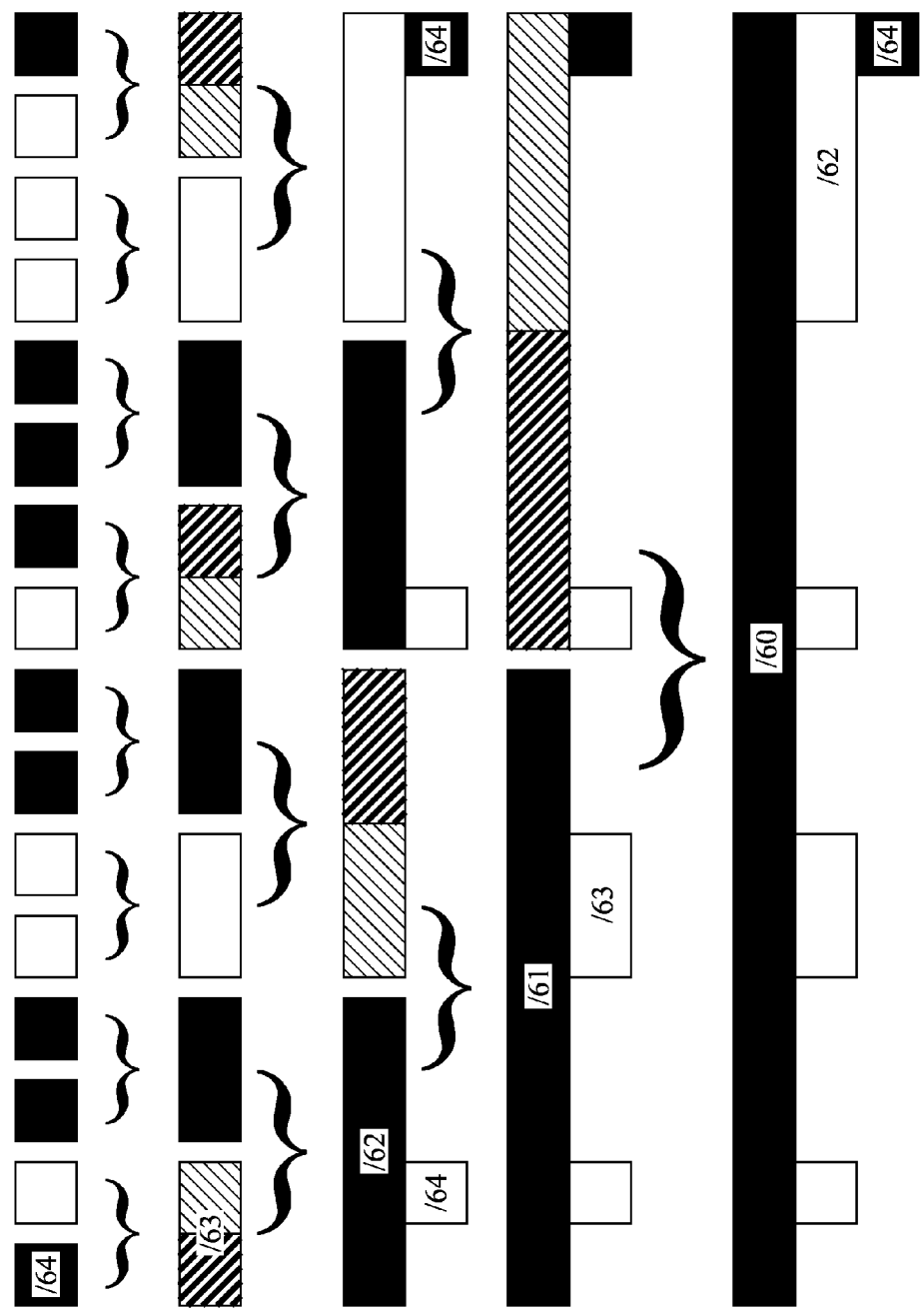
FIGS. 7A-7B illustrate a block-based example of route aggregation of the bitmap in FIG. 5C.
Figure 7B:
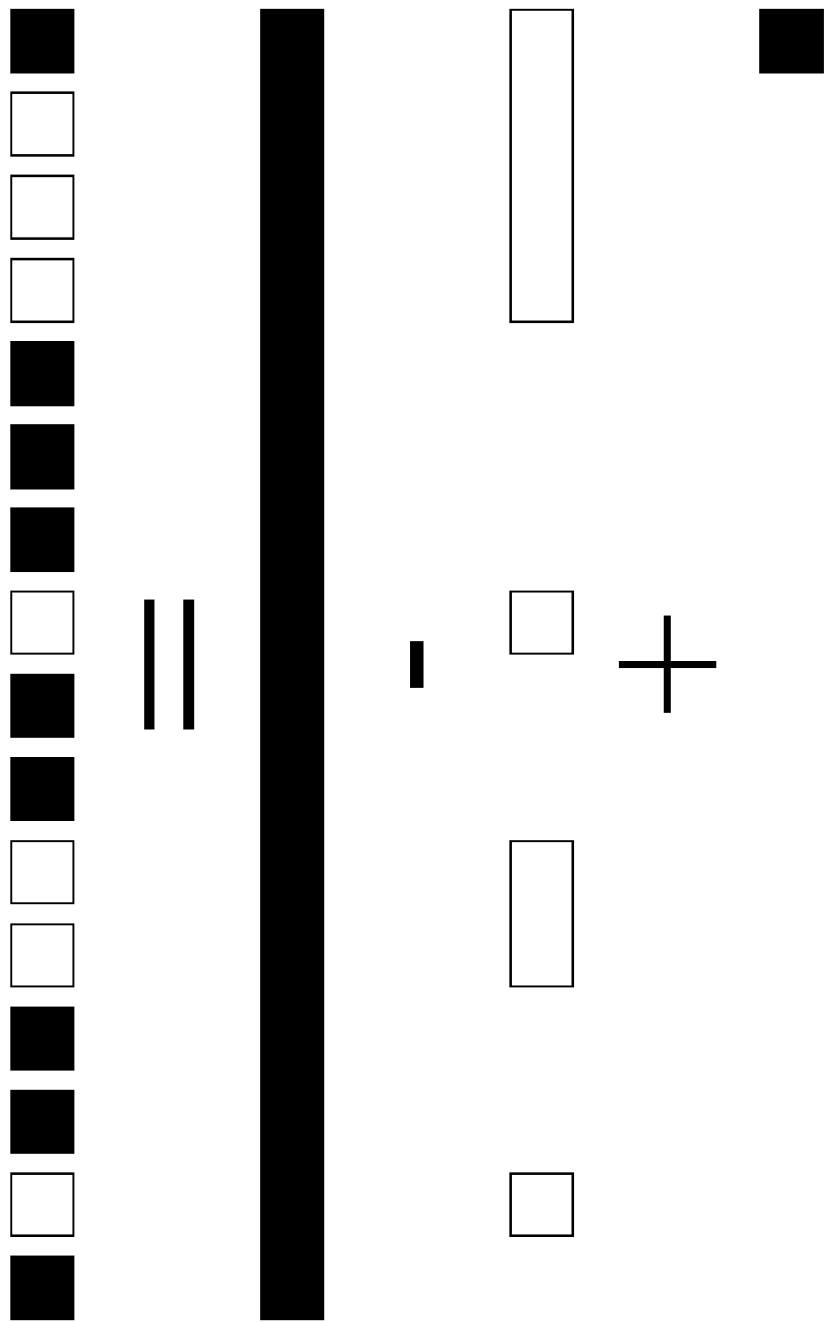

As shown in FIG. 7A, by applying this logic to the example bitmap 500 in FIG. 5C, a series of recursive aggregations are made from the /64 bitmap to a fully resolved solution involving a single /60 reachable route prefix, four /62 no-route (negative route) prefix exceptions within that /60 route prefix, and then a /64 reachable exception to that no-route exception. That is, as shown in FIG. 7B, the individual /64 prefixes of the bitmap 500 can be represented as the single /60 reachable route prefix, less four /62 no-route (negative route) prefixes, and an additional /64 reachable route prefix.

In non-bitmap format, as shown in FIG. 8A, the aggregation of the above prefix values results in the following aggregated route and no-route prefixes:
Route:
2001:db8::/60,
less (exception):
2001:db8:0:1::/64;
2001:db8:0:4::/63;
2001:db8:0:8::/64; and
2001:db8:0:c::/62,
plus (exception to exception):
2001:db8:0:f::/64.

As shown in FIG. 8B, the aggregation has thus reduced the original nine prefixes down to six prefixes (some positive/reachable routes, some negative/non-reachable no-routes).

The resultant prefixes (route prefixes, no-route prefix exceptions, route prefix exceptions to the no-route prefix exceptions, etc.) from the aggregation may then be utilized by the network device for either an advertisement into the computer network (e.g., one or more advertisements or DAOs 300 for both types of prefixes, or a route prefix DAO and a new "negative DAO" for no-routes), or as stored prefixes in a corresponding routing table, or both. (Note that a node's ability to receive and/or transmit aggregated routes according to the techniques herein may be advertised as a node capability as well, thus allowing nodes in the network to manage neighbor participation accordingly.)

Figure 9A:
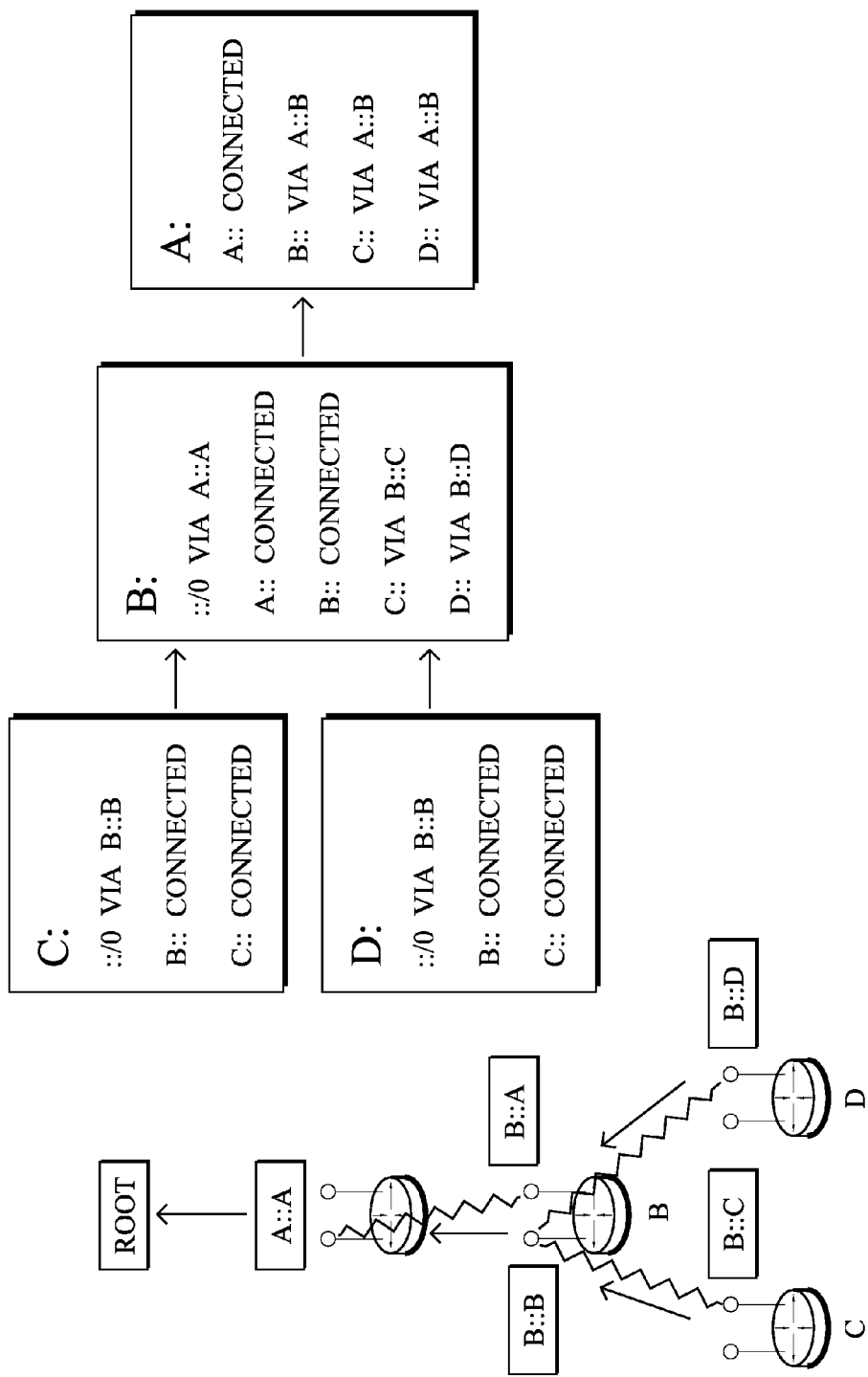
FIGS. 9A-9B illustrate examples of route storage.
Figure 9B:
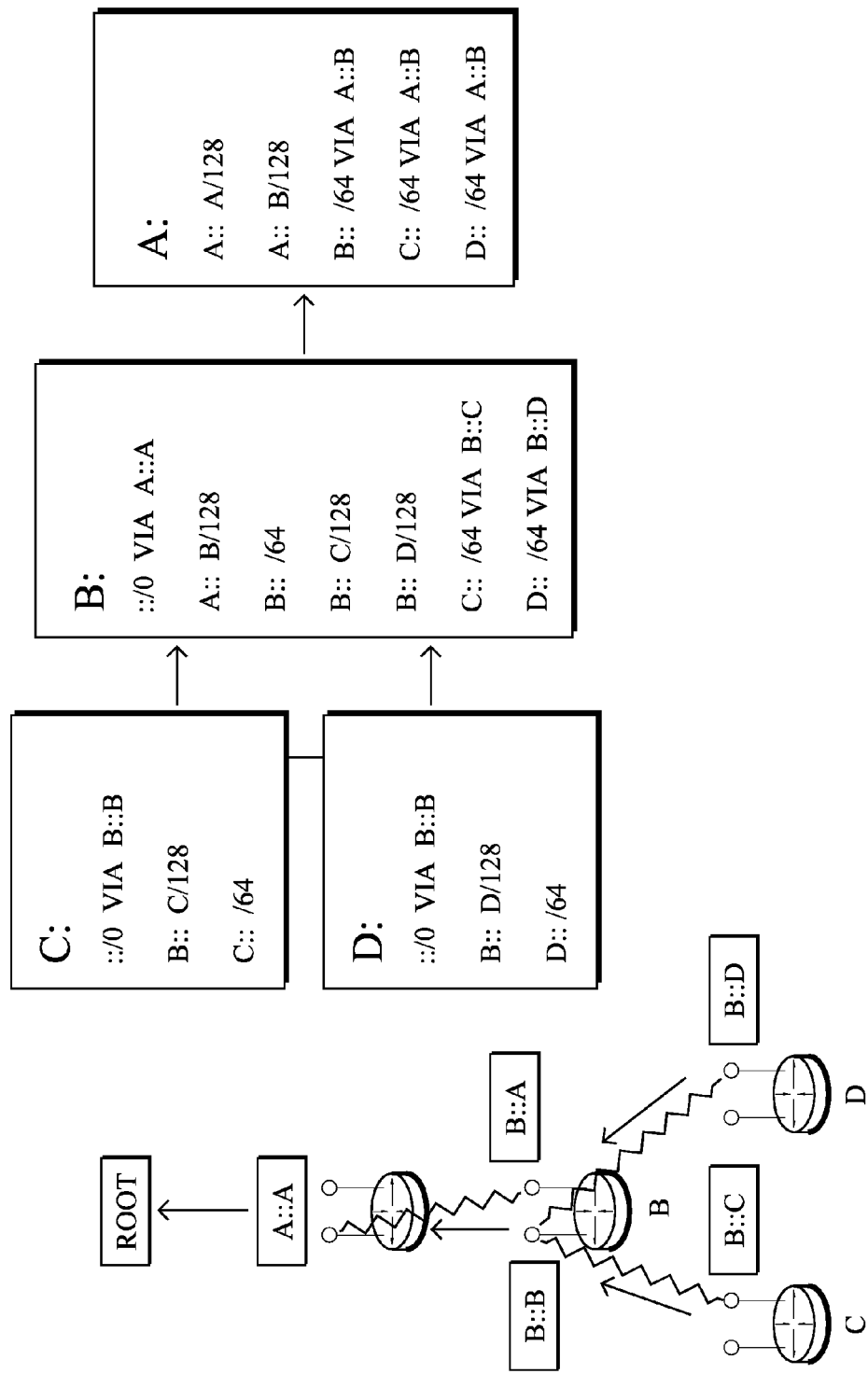

For instance, FIG. 9A illustrates how an example RPL protocol may store prefixes (in simplified representative form), i.e., where a child node (e.g., C and D) notifies a DAG parent node (e.g., B) of its routes, and then the parent node notifies its parent (A) of the combined reachable prefixes, etc. In accordance with the techniques herein, these combined routes are embodied as the route prefixes and no-route prefix exceptions, etc. As shown in FIG. 9A, connected multipoint routes may be used, in which case A abstracts the entire A::/64 as one route, but then it has to resolve A::B on demand and pay an often prohibitive cost of Neighbor Discovery. An alternative would be for B to advertise B::A/128, as shown in FIG. 9B, in which case A's stored routes become:

A::A/128 (self on interface)
A::B/128 (via B's link local address over interface)
B::/64 via A::B
C::/64 via A::B
D::/64 via A::B In this alternative mode shown in FIG. 9B, if node D selects B as its parent and attaches to B, thus forming B::D, D will advertise B::D/128 and D::/64 to B. Similarly, if node C selects B as its parent and attaches to B, thus forming C::D, C will advertise B::C/128 and C::/64 to B. Thus B will advertise A::B/128, B::/64, C::/64 and D::/64 to A (and stores the corresponding C/128 and D/128 as shown). In this manner, the illustrative /128 advertisement is useful to avoid the high cost of Neighbor Discovery.

Figure 10B:
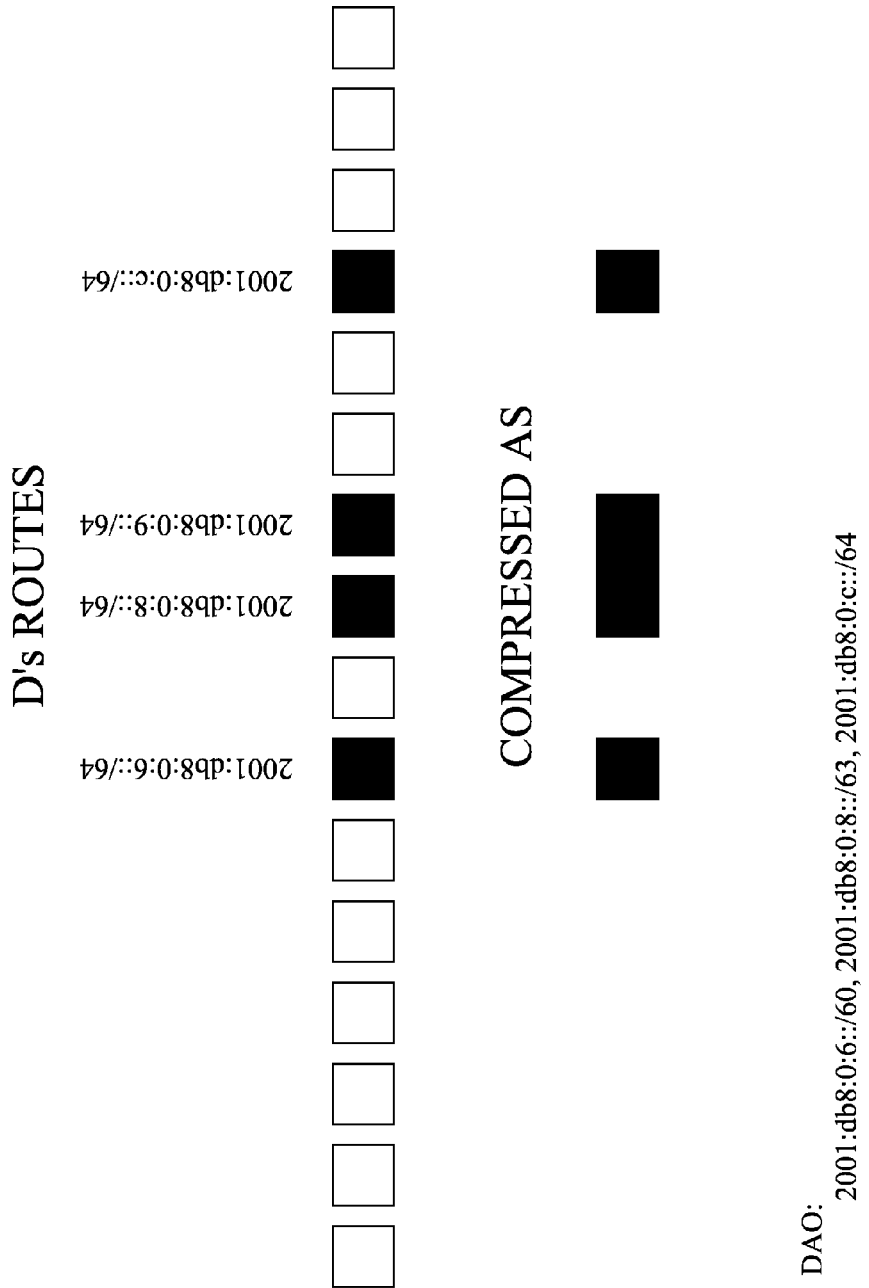
Figure 10C:
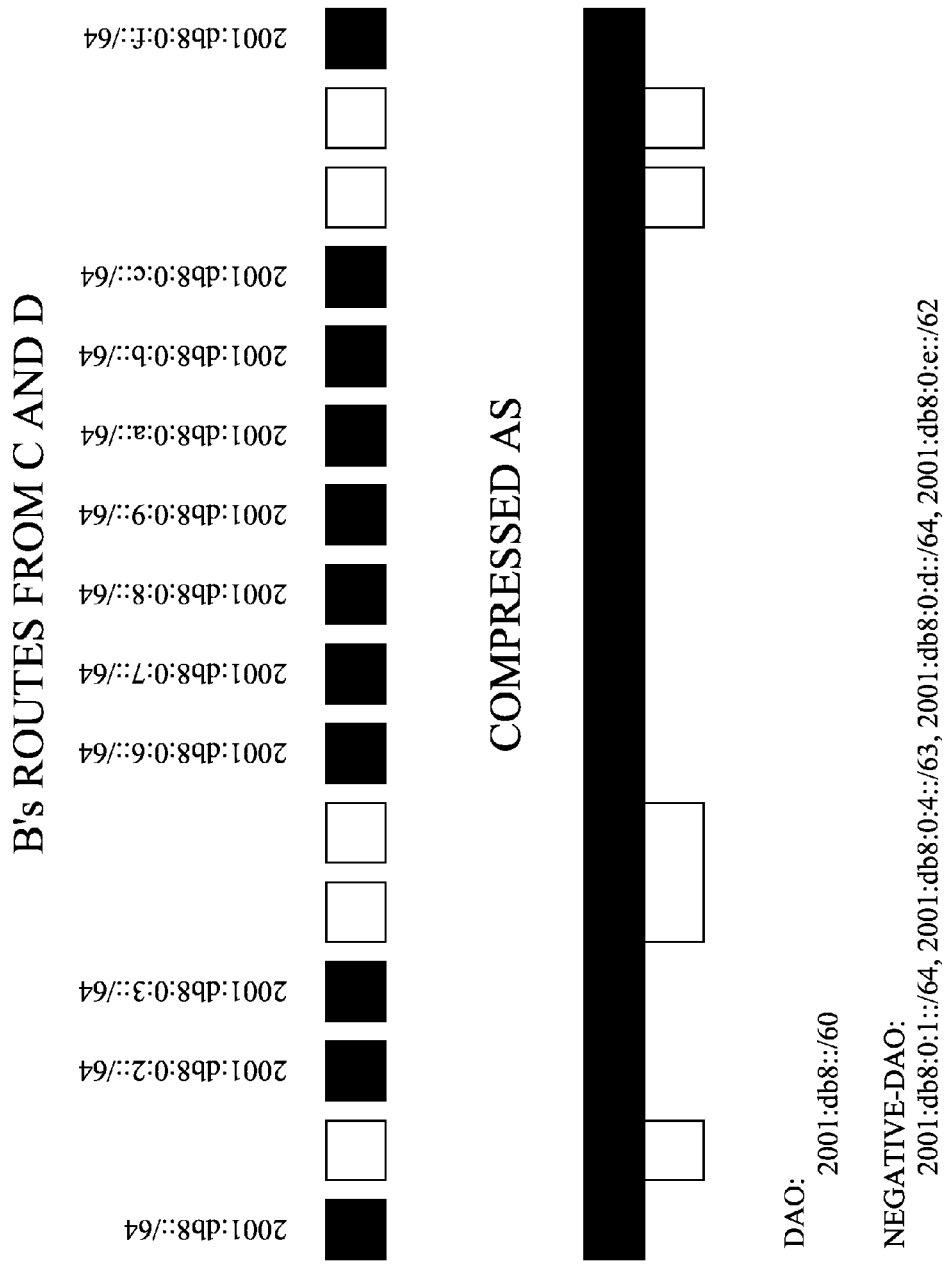

FIGS. 10A-10C illustrate how routing tables and/or advertisements can aggregate the union of all the routing table entries (e.g., and the network device's own prefixes), which could be stored or advertised to its neighbors (e.g., parents). For instance, a network device, e.g., node B, may receive and store routes for child node C, shown in FIG. 10A, which illustratively is the aggregation result from FIGS. 7A-8B above. Node B may also receive and store routes for another child node D, shown in FIG. 10B.

Note that by using the aggregation techniques herein, the routing tables for reachability via nodes C and D may also be aggregated together, as is shown in FIG. 10C. Note that where reachability overlaps for node C and node D (e.g., 2001:db8:0:6::/64 or 2001:db8:0:9::/64), node B may select a chosen path via one of the child nodes based on various routing metrics, as understood by those skilled in the art. Accordingly, it may be required to still store additional information regarding the selected path (i.e., whether the route was via C or D). Regardless, node B can advertise the aggregated result shown in FIG. 10C to its parent, e.g., node A, without concern for whether the routes a reachable via C or D, since that decision may generally be hidden to node A.

According to one or more embodiments herein, for each child, the parent node may thus receive and maintain a routing table that it can look up for a longest match. If the longest match is a no-route then the child can not reach the destination. Adversely, if the longest match is a normal route then the child can reach the destination. Since the router has a limited number of children, it may generally only require a limited number of lookups to find a child that can reach the destination. In one particular embodiment, a first table stores routes and a second table stores no-routes, such that reachability is determined based on a longest match lookup between the first and second tables. Alternatively, a shared table may be used for both routes and no-routes, where a field in each entry indicates whether the entry is a reachable route or a non-reachable no-route.

Note that since some nodes may move within a network (e.g., within a DAG), network devices may be configured to only perform such aggregation operations after the expiration of a configurable timer (that could dynamically computed by the DAG root based on its observation of the network stability) so as to avoid too much processing on the nodes and changes advertising new routes. Alternatively, as described in greater detail below, a more specific destination (e.g., an additional/exceptional /64 target within an aggregated /48 prefix) may be advertised to associate a transit property to those specific nodes that may move more frequently than others.

Additionally, in certain specific embodiments, a network device may run an algorithm to avoid aggregating blocks that are separated by a too large number of "holes" in order to reduce the number of no-route updates. That is, by using a pre-configured separation threshold range of no-routes (e.g., route blocks separated by a too many no-route blocks or too large a no-route block) would result in a plurality of separate reachable route prefixes, rather than a single reachable route prefix with large gaps.

Figure 11:
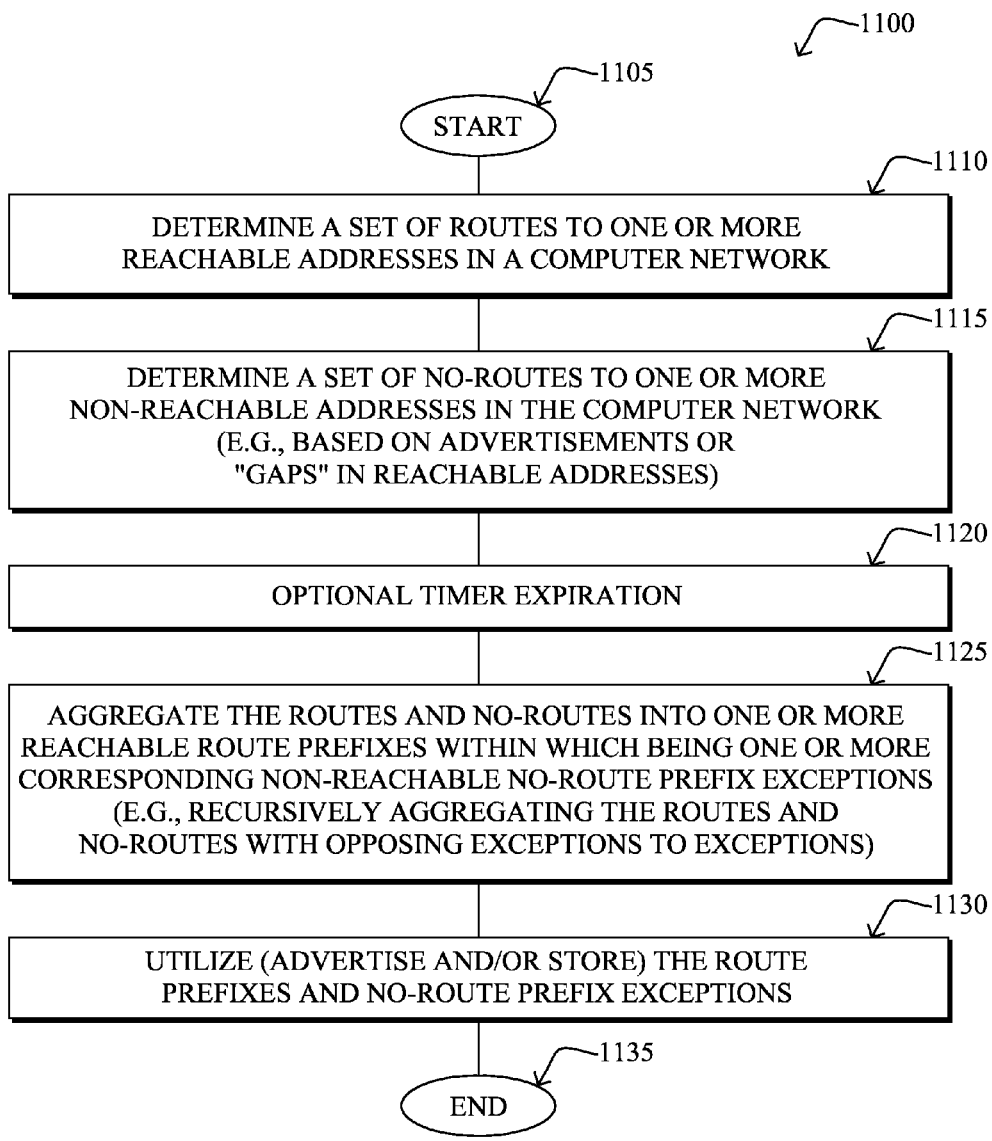
FIG. 11 illustrates an example simplified procedure for route aggregation with exception handling in a computer network.

FIG. 11 illustrates an example simplified procedure for route aggregation with exception handling in a computer network in accordance with one or more embodiments described herein. The procedure 1100 starts at step 1105, and continues to step 1110, where, as described in greater detail above, a network device 200 determines a set of routes to one or more reachable addresses in a computer network, as well as a set of no-routes to one or more non-reachable addresses in step 1115. For instance, as described above, the addresses may be reachable or not (or otherwise unused) based on local configuration or discovery, or more particularly, via advertisements from neighboring devices. In certain situations, the non-reachable addresses may be advertised specifically as no-routes (or negative routes), or else may simply be the "gaps" in the set of reachable addresses that are not specifically noted as being reachable (e.g., within a given network address space).

In step 1125, optionally after expiration of a timer in step 1120 as mentioned above, the routes and no-routes may be aggregated into one or more reachable route prefixes within which exist one or more corresponding non-reachable no-route prefix exceptions, as described in detail above. For instance, the routes and no-routes may be recursively aggregated into opposing/nested groups of exceptions to exceptions.

As also described in detail above, in step 1130 the aggregated route prefixes and no-route prefix exceptions may be utilized, such as being advertised and/or stored. The procedure 1100 illustratively ends in step 1135, though may return to various steps above, such as learning new routes or no-routes, or waiting for the timer, utilizing the aggregated results, etc.

Figure 12A:
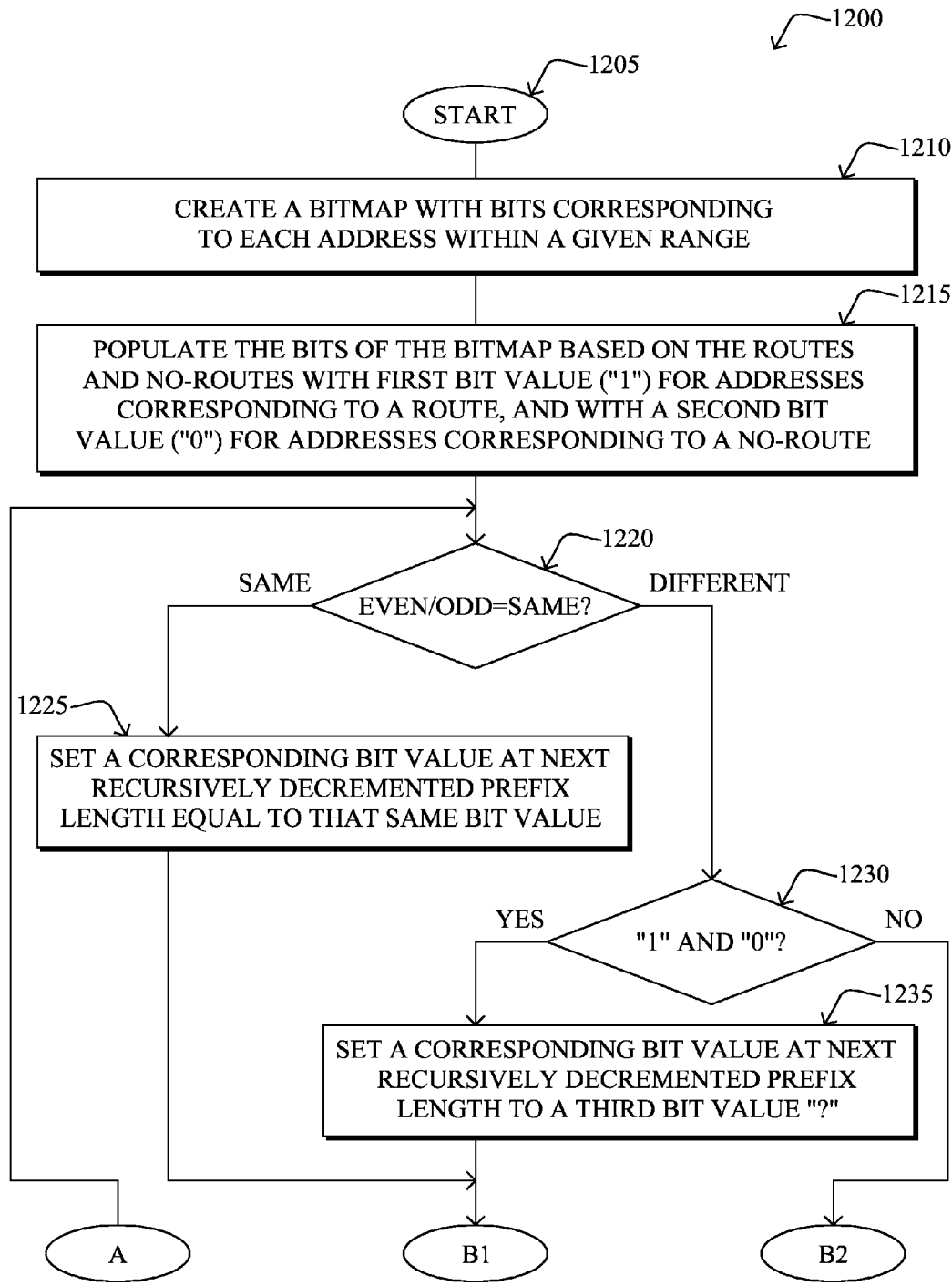
FIGS. 12A-12B illustrate another example simplified procedure for route aggregation with exception handling in a computer network, e.g., according to a particular illustrative merging algorithm.
Figure 12B:
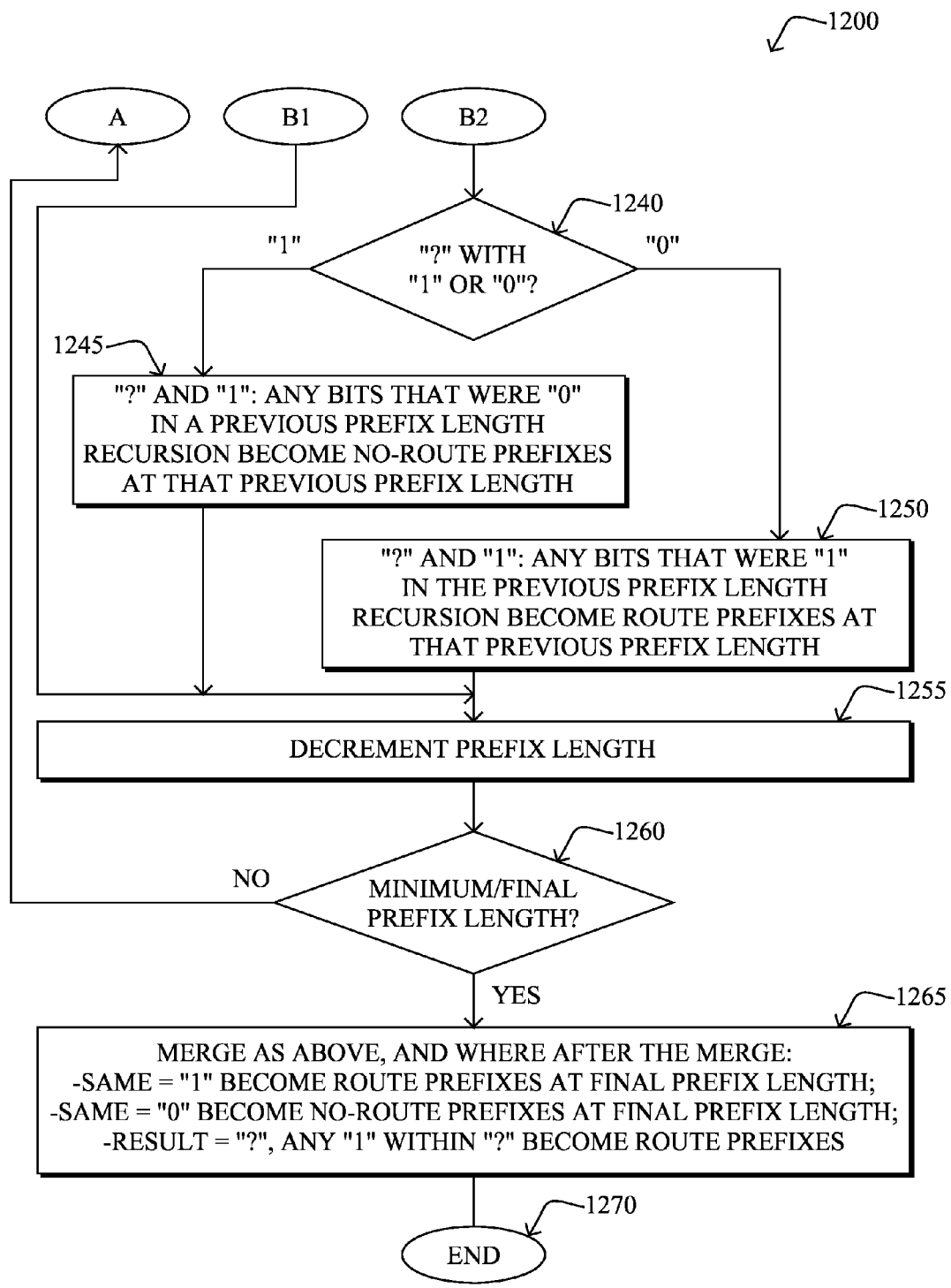

In addition, FIGS. 12A-12B illustrate another example simplified procedure for route aggregation with exception handling in a computer network in accordance with one or more embodiments described herein, e.g., according to a particular illustrative merging algorithm. The procedure 1200 starts at step 1205, and continues to step 1210, where, as described in greater detail above, a bitmap is created with bits corresponding to each address within a given range, and which is populated in step 1215 based on the routes and no-routes with a first bit value (e.g., "1") for addresses corresponding to a route, and with a second bit value (e.g., "0") for addresses corresponding to a no-route. Thereafter, the procedure 1200 recursively merges each even prefix with its adjacently corresponding odd prefix (for each decremented prefix length in a range of available prefix lengths), as described above.

In particular, if in step 1220 the even/odd pair have the same bit value (whether it is a "1," "0," or a "?"), then in step 1225 a corresponding bit value at the next recursively decremented prefix length is set equal to that same bit value. Conversely, if the even/odd pair have different bit values, then if those bit values are only the first and second bit values (i.e., are "1" and "0") in step 1230, then a corresponding bit value at a next recursively decremented prefix length is set equal to a third bit value (e.g., "?") in step 1235.

Once the next prefix length bit value is set (to a "1," "0," or a "?"), then the procedure 1200 proceeds via B1 to FIG. 12B to decrement the prefix length (step 1255) and continue recursively. However, if in step 1230 the even/odd pair have different bit values that include a third bit value (i.e., one of the values is a "?"), then the procedure moves to FIG. 12B via B2, and continues based on whether in step 1240 the third value ("?") is merged with a "1" or a "0." In particular, in step 1245, if the "?" is merged with a "1," any bits that were a "0" in a previous prefix length recursion become no-route prefixes at that previous prefix length. That is, when the even prefix and odd prefix are different bit values selected from the first and third bit values, any bits that were the second value in a previous prefix length recursion become no-route prefixes at that previous prefix length. Conversely, in step 1250, when the even prefix and odd prefix are different bit values selected from the second and third bit values (e.g., "?" and "0"), any bits that were the first value (e.g., "1") in the previous prefix length recursion become route prefixes at that previous prefix length.

Once identified as route prefixes or no-route prefixes, or else once the bitmap for the next prefix length is set to "1," "0," or "?" from B1 above, then in step 1255 the prefix length is decremented, such that if not the minimum/final prefix length in step 1260, the aggregation procedure recursively continues to step 1220 (via "A") to merge even/odd bit pairs. If, on the other hand, the minimum/final prefix length is reached, then in step 1265, the same general merge technique in the steps above occurs once more, but in this instance, rather than setting any "next prefix length bit values," the techniques create route prefixes at the final prefix length for any merge resulting in a "1," no-route prefixes at the final prefix length for any merge resulting in a "0," and route prefixes for any "1" bit left in a resultant "?" block, as described above in greater detail. The procedure then illustratively ends in step 1270.

It should be noted that while certain steps within procedures 1100-1200 may be optional as described above, the steps shown in FIGS. 11-12B are merely examples for illustration, and certain other steps may be included or excluded as desired. Further, while a particular order of the steps is shown, this ordering is merely illustrative, and any suitable arrangement of the steps may be utilized without departing from the scope of the embodiments herein. Moreover, while procedures 1100-1200 are described separately, certain steps from each procedure may be incorporated into each other procedure, and the procedures are not meant to be mutually exclusive.

The novel techniques described herein, therefore, provide for route aggregation with exception handling in a computer network. In particular, through the compression techniques described herein to provide ranges and exception handling using reachable routes and non-reachable no-route entries and/or advertisements, the size of routing tables and/or the routing overhead traffic may be reduced, thus addressing a critical concern in constrained networks.

While there have been shown and described illustrative embodiments that provide for route aggregation with exception handling in a computer network, it is to be understood that various other adaptations and modifications may be made within the spirit and scope of the embodiments herein. For example, the embodiments have been shown and described herein with relation to constrained networks, such as LLNs. However, the embodiments in their broader sense are not as limited, and may, in fact, be used with other types of networks and/or corresponding protocols. In addition, while certain protocols are shown, such as RPL, other suitable protocols may be used, accordingly. Specifically, though certain provisions have been mentioned above based on the typical operation of RPL-based networks, where other protocols operate differently, then corresponding provisions may be made to the techniques herein without departing from the scope of the disclosure.

In addition, it should be noted that prefixes are compressed, certain associated metadata may be lost (e.g., in the transit information option/field 327 of a DAO 300), unless that metadata can be factorized or ignored. Accordingly, it may be beneficial where even if a prefix is compressed (announced positively), for example, inside a /48, then an associated /64 may still be sent out as an additional/exceptional target in order to pass metadata. That is, rather than the exception to a route being a no-route, the exception may be a route with specific attributes/metadata. For instance, there are three relevant fields there in the transit option 327 in RPL DAOs:

path control: which may be removed to avoid eliminating path diversity, thus potentially improving the compression ratio of the techniques herein.

path sequence: a target increments the sequence upon each DAO where it advertises itself to one or more parents, and is used upon movement for cleanup of stale routes that are still based on the earlier sequence and location. Note that with a typical RPL application, there is little or no voluntary movement, so for such nodes the sequence number can be synchronized, or periodic with implicit increase, in which case it can be factorized. For a node with rapid movements, though, it is may be useful to add a separate copy of the target+transit (prefix field 326 and transit field 327) so as to indicate a fine grained sequence, thus requiring more rapid cleanup of stale routes that are still based on the earlier sequence and location.

path lifetime. A minimum value may be used (which is typically very long), and as prefixes are aggregated, any exceptions to this minimum may be factorized with a more specific target/prefix.

In addition, if there is a need to factorize something, such as some shared topological information, more than one table may be created, each for a factorized property. However, without further provisions outside the scope of the embodiments described herein, this may not extend well to the classical routing protocol when each advertisement has specific metadata like an associated cost.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method, comprising:
   determining, at a network device, a set of routes to one or more reachable addresses in a computer network;
   determining a set of no-routes to one or more non-reachable addresses in the computer network;
   recursively aggregating the routes and no-routes into one or more reachable route prefixes within which there are one or more corresponding non-reachable no-route prefix exceptions to exceptions, wherein aggregating includes:
      creating a bitmap with bits corresponding to each address within a given range, wherein based on the routes and no-routes, the bits of the bitmap are populated with a first bit value for addresses corresponding to a route, and with a second bit value for addresses corresponding to a no-route, and
      recursively merging each even prefix with its adjacently corresponding odd prefix for each decremented prefix length in a range of available prefix lengths; and
   utilizing the route prefixes and no-route prefix exceptions.

2. The method as in claim 1, wherein utilizing comprises:
   advertising the route prefixes and no-route prefix exceptions into the computer network.

3. The method as in claim 2, wherein the network device is a node within a directed acyclic graph (DAG), and wherein advertising comprises:
   notifying a DAG parent node of the route prefixes and no-route prefix exceptions.

4. The method as in claim 1, wherein utilizing comprises:
   storing the route prefixes and no-route prefix exceptions in one or more routing tables at the network device.

5. The method as in claim 4, wherein the network device is a node within a directed acyclic graph (DAG), and wherein storing comprises:
   storing one or more routing tables for each DAG child of the network device.

6. The method as in claim 4, wherein storing comprises:
   storing a first table for routes and a second table for no-routes, wherein reachability is determined based on a longest match lookup between the first and second tables.

7. The method as in claim 1, wherein determining no-routes comprises:
   identifying addresses within a given address range that are not the reachable addresses.

8. The method as in claim 1, wherein determining routes and no-routes comprises:
   receiving an advertisement from one or more neighbors with associated aggregated route prefixes and no-route prefix exceptions.

9. The method as in claim 1, wherein aggregation is performed in response to expiration of a configurable timer.

10. The method as in claim 1, wherein the one or more reachable route prefixes are a plurality of reachable route prefixes in response to corresponding routes being separated by at least a threshold range of no-routes.

11. The method as in claim 1, wherein at least one of the non-reachable no-route prefix exceptions has within it one or more reachable route prefix exceptions to the associated no-route prefix exception.

12. The method as in claim 1, wherein:
   i) when the even prefix and odd prefix are different bit values selected from the first and second bit values, a corresponding bit value at a next recursively decremented prefix length is equal to a third bit value;
   ii) when both the even prefix and odd prefix are a same bit value, a corresponding bit value at a next recursively decremented prefix length is equal to that same bit value;
   iii) when the even prefix and odd prefix are different bit values selected from the first and third bit values, any bits that were the second value in a previous prefix length recursion become no-route prefixes at that previous prefix length; and
   iv) when the even prefix and odd prefix are different bit values selected from the second and third bit values, any bits that were the first value in the previous prefix length recursion become route prefixes at that previous prefix length.

13. An apparatus, comprising:
   one or more network interfaces to communicate in a computer network;
   a processor coupled to the network interfaces and adapted to execute one or more processes; and
   a memory configured to store a process executable by the processor, the process when executed operable to:
      determine a set of routes to one or more reachable addresses in the computer network;
      determine a set of no-routes to one or more non-reachable addresses in the computer network;
      recursively aggregate the routes and no-routes into one or more reachable route prefixes within which there are one or more corresponding non-reachable no-route prefix exceptions to exceptions, wherein the process when executed to aggregate is further operable to:
         create a bitmap with bits corresponding to each address within a given range, wherein based on the routes and no-routes, the bits of the bitmap are populated with a first bit value for addresses corresponding to a route, and with a second bit value for addresses corresponding to a no-route, and
         recursively merge each even prefix with its adjacently corresponding odd prefix for each decremented prefix length in a range of available prefix lengths; and
      utilize the route prefixes and no-route prefix exceptions.

14. The apparatus as in claim 13, wherein the process when executed to utilize the route prefixes and no-route prefix exceptions is further operable to:
   advertise the route prefixes and no-route prefix exceptions into the computer network.

15. The apparatus as in claim 13, wherein the process when executed to utilize the route prefixes and no-route prefix exceptions is further operable to:
   store the route prefixes and no-route prefix exceptions in one or more routing tables.

16. The apparatus as in claim 15, wherein the process when executed is further operable to:
   store a first table for routes and a second table for no-routes; and
   determine reachability based on a longest match lookup between the first and second tables.

17. The apparatus as in claim 13, wherein the process when executed to determine routes and no-routes is further operable to:
   receive an advertisement from one or more neighbors with associated aggregated route prefixes and no-route prefix exceptions.

18. The apparatus as in claim 13, wherein:
   i) when the even prefix and odd prefix are different bit values selected from the first and second bit values, a corresponding bit value at a next recursively decremented prefix length is equal to a third bit value;
   ii) when both the even prefix and odd prefix are a same bit value, a corresponding bit value at a next recursively decremented prefix length is equal to that same bit value;
   iii) when the even prefix and odd prefix are different bit values selected from the first and third bit values, any bits that were the second value in a previous prefix length recursion become no-route prefixes at that previous prefix length; and
   iv) when the even prefix and odd prefix are different bit values selected from the second and third bit values, any bits that were the first value in the previous prefix length recursion become route prefixes at that previous prefix length.

19. A tangible, non-transitory, computer-readable media having software encoded thereon, the software when executed by a processor operable to:
   determine a set of routes to one or more reachable addresses in the computer network;
   determine a set of no-routes to one or more non-reachable addresses in the computer network;
   recursively aggregate the routes and no-routes into one or more reachable route prefixes within which that are one or more corresponding non-reachable no-route prefix exceptions to exceptions, wherein the software when executed to aggregate is further operable to::
   create a bitmap with bits corresponding to each address within a given range, wherein based on the routes and no-routes, the bits of the bitmap are populated with a first bit value for addresses corresponding to a route, and with a second bit value for addresses corresponding to a no-route, and
   recursively merge each even prefix with its adjacently corresponding odd prefix for each decremented prefix length in a range of available prefix lengths; and
   utilize the route prefixes and no-route prefix exceptions.

20. The computer-readable media as in claim 19, wherein the software when executed to utilize the route prefixes and no-route prefix exceptions is further operable to perform at least one of either advertisement of the route prefixes and no-route prefix exceptions into the computer network or storage of the route prefixes and no-route prefix exceptions in one or more routing tables.

21. The computer-readable media as in claim 19, wherein:
   i) when the even prefix and odd prefix are different bit values selected from the first and second bit values, a corresponding bit value at a next recursively decremented prefix length is equal to a third bit value;
   ii) when both the even prefix and odd prefix are a same bit value, a corresponding bit value at a next recursively decremented prefix length is equal to that same bit value;
   iii) when the even prefix and odd prefix are different bit values selected from the first and third bit values, any bits that were the second value in a previous prefix length recursion become no-route prefixes at that previous prefix length; and
   iv) when the even prefix and odd prefix are different bit values selected from the second and third bit values, any bits that were the first value in the previous prefix length recursion become route prefixes at that previous prefix length.

\* \* \* \* \*